United States Patent
Yasaki et al.

(10) Patent No.: US 9,135,463 B2
(45) Date of Patent: Sep. 15, 2015

(54) STORAGE DEVICE, METHOD FOR ACCESSING STORAGE DEVICE, AND STORAGE MEDIUM STORING PROGRAM FOR ACCESSING STORAGE DEVICE

(75) Inventors: Kouichi Yasaki, Kawasaki (JP); Toshihiro Sonoda, Kawasaki (JP)

(73) Assignee: FUJITSU LIMITED, Kawsaki (JP)

( * ) Notice: Subject to any disclaimer, the term of this patent is extended or adjusted under 35 U.S.C. 154(b) by 325 days.

(21) Appl. No.: 12/721,999

(22) Filed: Mar. 11, 2010

(65) Prior Publication Data
US 2010/0235575 A1 Sep. 16, 2010

(30) Foreign Application Priority Data

Mar. 13, 2009 (JP) ................................. 2009-060863
Sep. 29, 2009 (JP) ................................. 2009-224555

(51) Int. Cl.
G06F 12/00 (2006.01)
G06F 21/62 (2013.01)
G06F 21/55 (2013.01)
G06F 21/79 (2013.01)
G06F 21/88 (2013.01)

(52) U.S. Cl.
CPC .......... *G06F 21/6218* (2013.01); *G06F 21/554* (2013.01); *G06F 21/79* (2013.01); *G06F 21/88* (2013.01)

(58) Field of Classification Search
None
See application file for complete search history.

(56) References Cited

U.S. PATENT DOCUMENTS

| | | | | |
|---|---|---|---|---|
| 6,904,493 B2 * | 6/2005 | Chiao et al. | ................... | 711/103 |
| 2004/0143750 A1 * | 7/2004 | Kulack et al. | ................. | 713/200 |
| 2004/0225832 A1 * | 11/2004 | Huang | .......................... | 711/105 |
| 2005/0206343 A1 * | 9/2005 | Ichinose et al. | ............... | 320/126 |
| 2005/0206353 A1 | 9/2005 | Sengoku | | |
| 2007/0245108 A1 * | 10/2007 | Yasaki et al. | .................. | 711/163 |

(Continued)

FOREIGN PATENT DOCUMENTS

| | | |
|---|---|---|
| JP | 2000-12793 | 1/2000 |
| JP | 2004-206683 | 7/2004 |

(Continued)

OTHER PUBLICATIONS

Japanese Office Action mailed Jul. 30, 2013 in corresponding Japanese Application No. 2009-224555.

(Continued)

*Primary Examiner* — Daniel Tsui
(74) *Attorney, Agent, or Firm* — Staas & Halsey LLP

(57) ABSTRACT

A storage device that stores data accessed by a host device via an interface includes a deactivation executing part performing a plurality of deactivating processes deactivating access to the data at different levels via the interface; a setting information storing part storing setting information which includes deactivation identifying information identifying the deactivating process and a condition under which the deactivating process is performed; a judging part referring to the setting information stored on the setting information storing part, comparing the condition represented by the setting information with an operation state of the storage device, and judging whether the condition represented by the setting information is satisfied or not; and a deactivation control part ordering the deactivation executing part to execute one of the plurality of deactivating processes identified with the deactivation identifying information represented by the setting information when the judging part has judged that the condition is satisfied.

18 Claims, 29 Drawing Sheets

(56) References Cited

U.S. PATENT DOCUMENTS

2008/0059743 A1* 3/2008 Bychkov et al. .............. 711/163
2009/0025091 A1* 1/2009 Koike et al. ..................... 726/28

FOREIGN PATENT DOCUMENTS

| JP | 2006-171907 | 6/2006 |
| JP | 2006-330949 | 12/2006 |
| JP | 2006-338583 | 12/2006 |
| JP | 2008-139945 | 6/2008 |
| JP | 2008-172701 | 7/2008 |

OTHER PUBLICATIONS

Extended European Search Report mailed Mar. 28, 2014 in corresponding European Application No. 10156159.5.

* cited by examiner

FIG.4

EXAMPLE OF LOG FORMAT

| # | RTC TIME | CAUSE | | THRESHOLD VALUE |
|---|---|---|---|---|
| 0 | 2009 02/25 12:00 | ELAPSED TIME | PARTIAL DELETION | 6000 sec |
| 1 | 2009 02/27 13:00 | USER PASSWORD FAILURE COUNT | PARTIAL DELETION | 5 TIMES |
| 2 | 2009 02/28 11:00 | LOW BATTERY REMAINING POWER | OVERWRITE DELETE AND LOCK | 2200mV |
| 3 | 2008/01/01 00:00 | ELAPSED TIME | ENCRYPTION KEY DELETION | RTC TIME |
| | | | INITIALIZATION | |

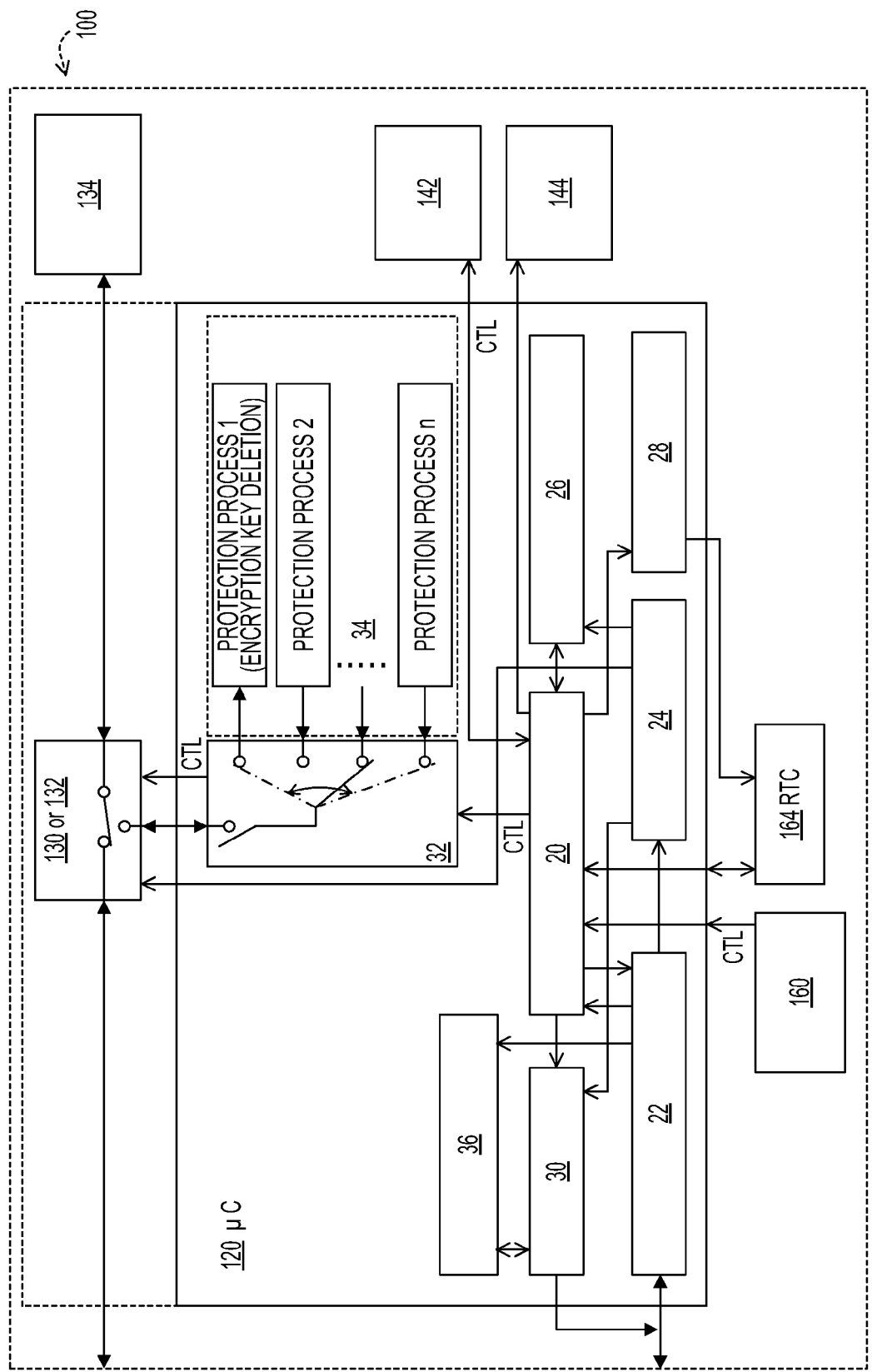

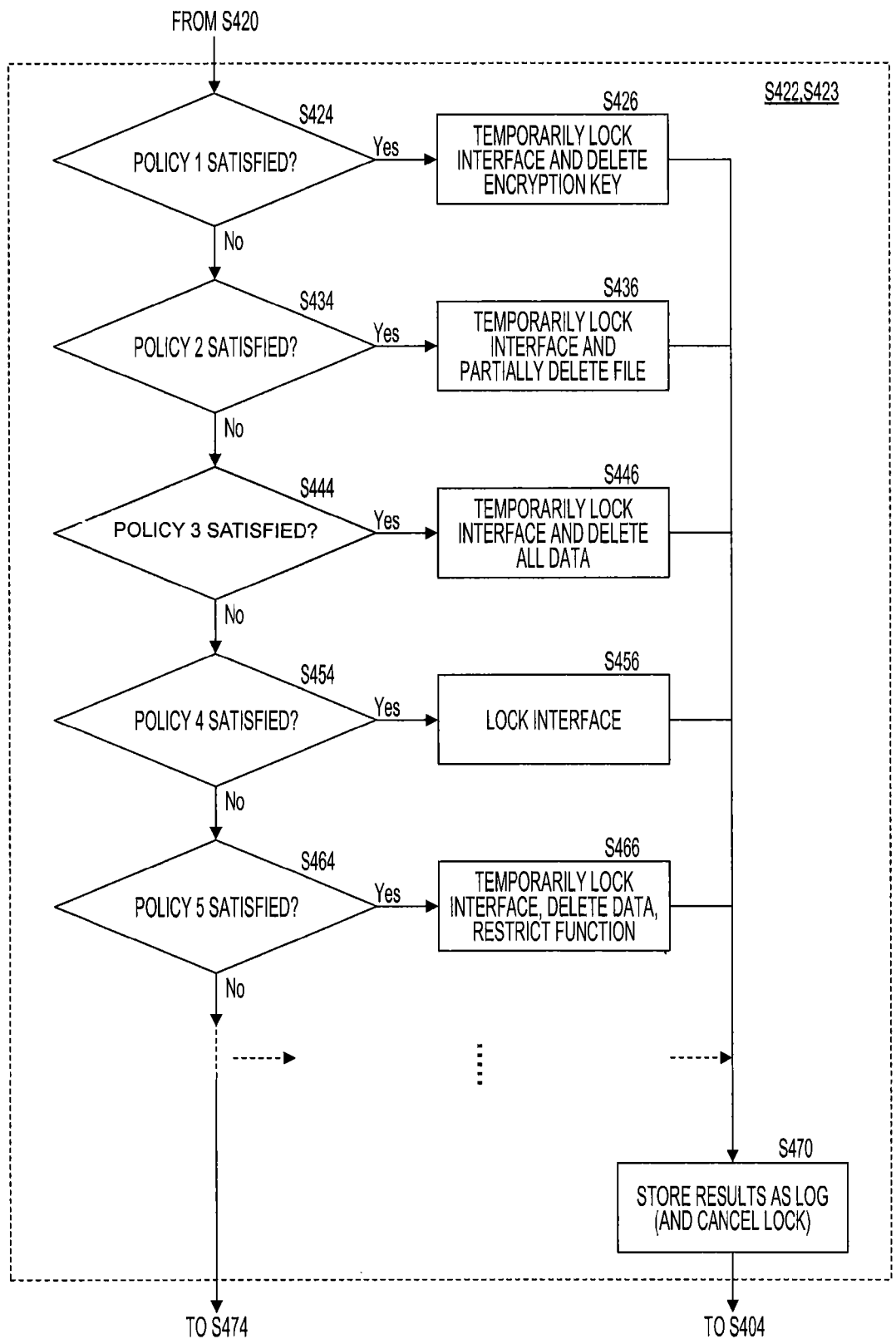

FIG.7A

FORMAT OF ACCESS DEACTIVATING POLICY

| Byte | 0 | 1 | 2 | 3 | 4 | 5 |
|---|---|---|---|---|---|---|
| ITEM | CAUSE OF ACCESS DEACTIVATION | ACCESS DEACTIVATING METHOD | THRESHOLD VALUE | | | |

FIG.7B

CAUSE OF ACCESS DEACTIVATION

| Bit | 0 | 1 | 2 | 3 | 4 | 5 | 6 | 7 |
|---|---|---|---|---|---|---|---|---|
| ITEM | ELAPSED TIME | REMAINING-BATTERY POWER | DEVICE AUTHENTICATING FAILURE COUNT | USER AUTHENTICATING FAILURE COUNT | ADMINISTRATOR AUTHENTICATING FAILURE COUNT | TIME FROM CONNECTION START TO AUTHENTICATION | COMMAND FROM USER | ELAPSED TIME FROM OPENING |

FIG.7C

ACCESS DEACTIVATION METHOD

| Bit | 0 | 1 | 2 | 3 | 4 |
|---|---|---|---|---|---|
| ITEM | OVERWRITING DELETION | PARTIAL DELETION | LOCKING OF FLASH MEMORY | DELETION OF ENCRYPTION KEY | FUNCTION LIMITATION |

FIG.8A

| # | CAUSE | ACCESS DEACTIVATION METHOD | THRESHOLD VALUE (EXAMPLE) |
|---|---|---|---|
| 1 | ELAPSED TIME | OVERWRITE DELETION | 120 hours |
| 2 | ELAPSED TIME | OVERWRITE DELETION + LOCKING | 144 hours |
| 3 | ELAPSED TIME | OVERWRITE DELETION + ENCRYPTION KEY DELETION | 150 hours |
| 4 | ELAPSED TIME | OVERWRITE DELETION + FUNCTION LIMITATION | 155 hours |
| 5 | ELAPSED TIME | OVERWRITE DELETION + LOCKING + ENCRYPTION KEY DELETION | 160 hours |
| 6 | ELAPSED TIME | OVERWRITE DELETION + ENCRYPTION KEY + FUNCTION LIMITATION | 168 hours |
| 7 | ELAPSED TIME | PARTIAL DELETION | 48 hours |
| 8 | ELAPSED TIME | PARTIAL DELETION + LOCKING | 50 hours |
| 9 | ELAPSED TIME | PARTIAL DELETION + ENCRYPTION KEY DELETION | 60 hours |
| 10 | ELAPSED TIME | PARTIAL DELETION + FUNCTION LIMITATION | 70 hours |
| 11 | ELAPSED TIME | PARTIAL DELETION + LOCKING + ENCRYPTION KEY DELETION | 80 hours |
| 12 | ELAPSED TIME | PARTIAL DELETION + ENCRYPTION KEY DELETION + FUNCTION LIMITATION | 90 hours |
| 13 | ELAPSED TIME | LOCKING | 100 hours |
| 14 | ELAPSED TIME | ENCRYPTION KEY DELETION | 110 hours |

FIG.8B

| # | CAUSE | ACCESS DEACTIVATION METHOD | THRESHOLD VALUE |
|---|---|---|---|
| 1 | ELAPSED TIME | OVERWRITE DELETION | 120 hours |
| 2 | ELAPSED TIME | OVERWRITE DELETION + LOCKING | 144 hours |
| 3 | ELAPSED TIME | OVERWRITE DELETION + ENCRYPTION KEY DELETION + FUNCTION LIMITATION | 168 hours |

FIG.15A

SCREEN FOR SETTING, ADDING AND UPDATING IDENTIFICATION INFORMATION OF INFORMATION PROCESSING APPARATUS

TYPE AND IDENTIFICATION INFORMATION OF DEVICE THAT IS PERMITTED TO ACCESS USB MEMORY

| | | |
|---|---|---|
| ☐ | PC1 | UUID1 |
| ☑ | PC1 | UUID1 |
| ☐ | PC1 | UUID1 |
| ⋮ | ⋮ | ⋮ |

[ OK ]  [ CANCEL ]

FIG.15B

SCREEN FOR SETTING, ADDING, AND UPDATING ACCESS DEACTIVATION POLICY

SETTING ACCESS DEACTIVATION POLICY

| | | CAUSE | ACCESS DEACTIVATION METHOD | THRESHOLD VALUE |
|---|---|---|---|---|
| ☑ | POLICY 1 | TIME | ENCRYPTION KEY DELETION | 24*3600 sec |
| ☑ | POLICY 2 | TIME | PARTIAL DELETION | 2*24*3600 sec |
| ☑ | POLICY 3 | TIME | OVERWRITE DELETION | 7*24*3600 sec |
| ⋮ | ⋮ | ⋮ | ⋮ | ⋮ |

[ OK ]  [ CANCEL ]

FIG.26A

| |
|---|
| 3000 |
| 2000 |
| 1000 |

FIG.26B

| |
|---|
| 3000 |
| 3000 |
| 2000 |

US 9,135,463 B2

STORAGE DEVICE, METHOD FOR ACCESSING STORAGE DEVICE, AND STORAGE MEDIUM STORING PROGRAM FOR ACCESSING STORAGE DEVICE

CROSS-REFERENCE TO RELATED APPLICATIONS

This application is based upon and claims the benefit of priority of the prior Japanese Patent Application No. 2009-060863, filed on Mar. 13, 2009, and the prior Japanese Patent Application No. 2009-224555, filed on Sep. 29, 2009, the entire contents of which are incorporated herein by reference.

FIELD

The present embodiments discussed herein relate to storage devices. In particular, the present embodiments relate to a storage device, such as a USB (universal serial bus) memory, accessed through an interface.

BACKGROUND

A USB memory is subject to loss. Several methods are available in the related art to prevent information leak from a lost USB memory. For example, in one method, the USB memory may be locked using a password. In another method, a data file is, encrypted. In yet another method, a data file is deleted in response to a password error.

According to Japanese Unexamined Patent Application Publication No. 2006-338583, there is a storage medium device controlling unauthorized data use for a computer terminal. The storage medium device is detachably loaded onto a computer terminal. The storage medium device includes a storage unit which the computer terminal reads data from and overwrites data on, elapsed time identifying means for identifying time that has elapsed since the storage of data on the storage unit, power source means supplying power at least causing the elapsed time identifying means to be operative, elapsed time judging means judging whether the elapsed time identified by the elapsed time identifying means exceeds a given usable period, and deactivation means deactivating a use of the data stored on the storage unit on condition that the elapsed time identified by the elapsed time identifying means exceeds the given usable period.

SUMMARY

According to an aspect of the embodiments discussed herein to provide a storage device, a storage device that stores data accessed by a host device via an interface includes a deactivation executing part performing a plurality of deactivating processes deactivating access to the data at different levels via the interface; a setting information storing part storing setting information which includes deactivation identifying information identifying the deactivating process and a condition under which the deactivating process is performed; a judging part referring to the setting information stored on the setting information storing part, comparing the condition represented by the setting information with an operation state of the storage device, and judging whether the condition represented by the setting information is satisfied or not; and a deactivation control part ordering the deactivation executing part to execute one of the plurality of deactivating process identified with the deactivation identifying information represented by the setting information when the judging part has judged that the condition is satisfied.

The object and advantages of the embodiment discussed herein will be realized and attained by means of elements and combinations particularly pointed out in the claims.

It is to be understood that both the foregoing general description and the following detailed and the following detailed description are exemplary and only are not restrictive exemplary explanatory are not restrictive of the invention, as claimed.

BRIEF DESCRIPTION OF DRAWINGS

FIG. 4 represents an example of a format of a log stored on a flash memory in the USB memory.

FIG. 5 is a functional block diagram generally depicting an example of a configuration and arrangement of major internal elements of a microcomputer of FIGS. 2 and 3.

FIG. 6B represents an operation chart of an example of another policy evaluation process for data protection that is executed by the microcomputer of the USB memory if the authenticating processor results in an authenticating failure in the authenticating process thereof.

FIG. 7A represents an example of a format of an access deactivating policy.

FIG. 7B represents an example of a definition of a value of a cause of an access deactivation in the format of FIG. 7A.

FIG. 7C represents an example of a definition of a value of an access deactivating method in the format of FIG. 7A.

FIG. 8A represents an example of a table of access deactivating methods performed in response to elapsed times as a cause and threshold values.

FIG. 8B represents an example of a table of the set access deactivating methods and threshold values.

FIG. 15A depicts an administrator screen displayed on a display of the information processing apparatus in operation S764 in FIG. 14A wherein the administrator may set, add, and modify identifying information of an information processing apparatus that is permitted to access the USB memory.

FIG. 15B depicts an administrator screen displayed on the display of the information processing apparatus in operation S764 in FIG. 14A wherein the access deactivating policy may be set, added, and modified on the USB memory.

FIG. 26A depicts IDs stored on a read ID history storage unit when the USB memory is carried into the office through the RF-ID gates in the order of gate C→gate B→gate A.

FIG. 26B depicts the IDs stored on the read ID history storage unit when the USB memory is carried into the office through the RF-ID gates in the order of gate A→gate B→gate C→gate C.

DESCRIPTION OF EMBODIMENTS

Figure 1:
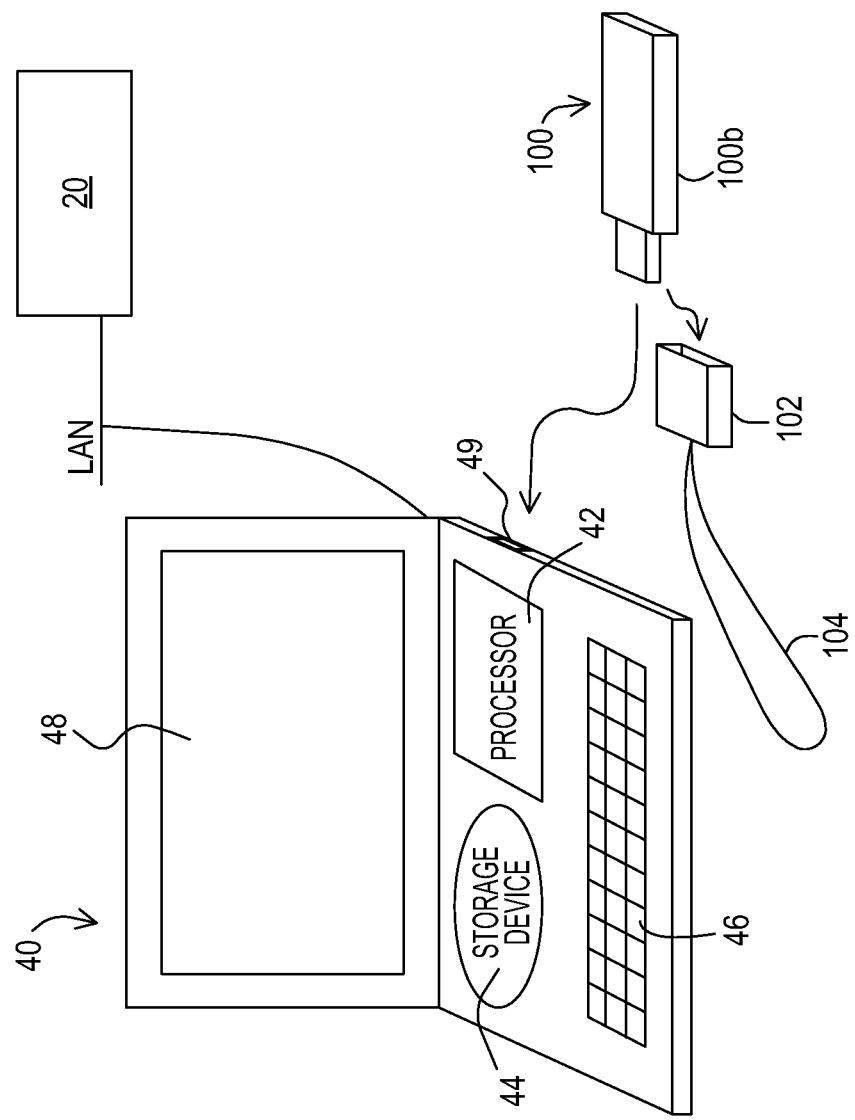
FIG. 1 depicts a personal computer as an information processing apparatus or a terminal, and a USB memory as a removable, recordable, and erasable medium in accordance with one embodiment of present invention.

Data may be deleted in a known USB memory in response to an attempt to make an unauthorized access. The inventor of this invention recognized a risk of data leakage because a data file is present until the data is deleted. The inventor also recognized a risk of data leakage as long as the file itself remains undeleted even if the data file is encrypted.

The data file is deleted by overwriting the data file on a known storage medium when a designated time is reached. The inventor also recognized inconvenience that even an authorized user cannot use the recording medium during the deleting process.

The inventor recognized that the data leakage is effectively prevented without degrading user friendliness if a plurality of protection levels deactivating access to a storage device and a plurality of time bands for protection are set.

In accordance with features of the present invention, a plurality of protection levels deactivating access to the storage device are provided, and different protection levels are provided for different time bands to deactivating access to the storage device.

The object and advantages of the present invention are achieved by a combination of elements specifically described in the claims.

The general description heretofore and the following detailed description are for exemplary purposes only, and are not intended to limit the scope of the present invention.

First Embodiment

A first embodiment of the present invention is described below with reference to the drawings. In the drawings, like elements are designated with like reference numerals.

FIG. 1 depicts an information processing apparatus 40 operating as a personal computer, and a USB memory 100 serving as a removable, programmable, and erasable medium. The personal computer is a host device in this embodiment. The USB memory 100 is connected to a USB port 49 of the information processing apparatus 40. The information processing apparatus 40 may be connected to a server 20 via a LAN (local-area network). The information processing apparatus 40 may be used by an administrator and/or a user.

The information processing apparatus 40 includes a processor 42, a storage device 44, an input device 46, display 48, and a USB port 49. The storage device 44 may be, for example, a hard disk.

Figure 2:
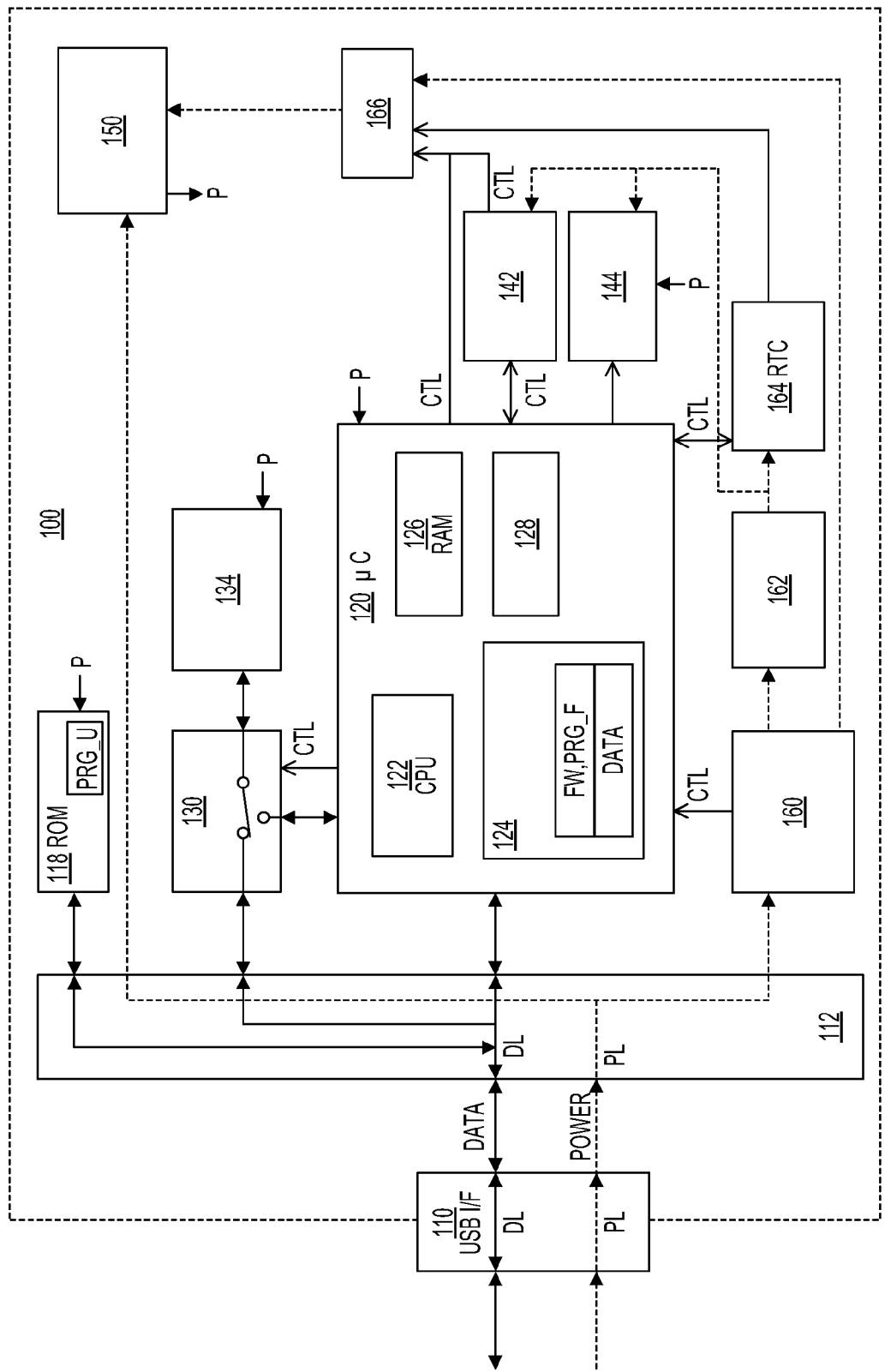
FIG. 2 is a block diagram diagrammatically depicting an example of a configuration and arrangement of a USB memory in accordance with one embodiment of the present invention.

FIG. 2 depicts a block diagram of an example of a configuration and arrangement of the USB memory 100 in accordance with the first embodiment of the present invention.

The USB memory 100 includes a USB I/F (interface) 110, a USB hub 112, a ROM 118, a μC (microcomputer) 120, a hub switch 130, a flash memory 134, an open/close sensor 142, and an indicator 144 such as a LED (light emitting diode). The USB memory 100 further includes a main power switch 150, a battery and charger 160, an auxiliary power source 162, a RTC (real-time clock) 164 for time displaying or time monitoring, and a switch 166. The flash memory 134 stores a data file of a user received from the information processing apparatus 40. The battery and charger 160 includes a rechargeable battery and a charging circuit for the rechargeable battery.

The USB I/F 110 includes a power source line or pin PL (single-arrow-headed broken lines) and data line or pin DL (double-arrow-headed solid lines). The USB hub 112 is connected to the USB I/F 110 and includes a branch power source line PL and branch data lines DL.

The open/close sensor 142 includes a magnetic detector, a current detector, a proximity switch, or the like (not illustrated) arranged in a connection section or an engagement section between a device body 100b and one of a cap 102 and a strap 104 of the USB memory 100 as illustrated in FIG. 1. One of the cap 102 and the strap 104 may include a permanent magnet detected by the magnetic detector, a resistor connected to the current detector, or a proximity member detected by the proximity detector. The permanent magnet, the resistor and the proximity member are not illustrated. The open/close sensor 142 detects that one of the cap 102 and the strap 104 has been removed from the USB memory 100, and detects that one of the cap 102 and the strap 104 has been connected to or engaged with the USB memory 100. The μC 120 may monitor and control a detected output of the open/close sensor 142. The switch 166 is turned on and off directly in response to the detection by the open/close sensor 142 or via the μC 120 in response to the detection by the open/close sensor 142.

The indicator 144 is controlled and driven by the μC 120. The indicator 144 may display an operation state of the USB memory 100 and remaining time to the deactivation of a first access or a next access or a protecting process by the μC 120.

The μC 120 includes a CPU (central processing unit) 122, a RAM (random-access memory) 126, an internal flash memory 124, and a power source controller 128. The internal flash memory 124 may store a FW (firmware) program (PROG_F) and data, which includes identifying information for authentication, an encryption key for a data file, access deactivation policies, log data, and state information.

A user USB memory utility program (PRG_U) for a user used by the USB memory 100 is stored in a ROM 118. A USB memory utility program (PRG_U) used by the CPU 122 of the microcomputer 120 is stored on the flash memory 124.

The USB memory 100 is connected to the USB port 49 of the information processing apparatus 40 via the DL of the USB I/F 110. The ROM 118 and the μC 120 are connected to the USB I/F 110 via the DL of the USB hub 112. The μC 120 is connected to the flash memory 134 via the DL of the hub switch 130, and is also connected to the battery and charger 160, the RTC (real-time clock) 164, the open/close sensor 142, and the indicator 144. The flash memory 134 is connected to one of the USB I/F 110 and the microcomputer 120 via the hub switch 130 and the DL of the USB hub 112.

The battery and charger 160 is powered from the USB port 49 of the information processing apparatus 40 via the PL of the USB hub 112 and the PL of the USB I/F 110 and charges the rechargeable battery. The battery and charger 160 supplies power to the auxiliary power source 162 and to the main power switch 150 via the switch 166. The battery and charger 160 is connected to the auxiliary power source 162. The main power switch 150 is also powered from the USB port 49 of the information processing apparatus 40 via the PL of the USB hub 112 and the PL of the USB interface 110. If the USB memory 100 is not connected to the information processing apparatus 40, the main power switch 150 is on-off controlled by the switch 166, and is thus powered from the battery and charger 160.

The switch 166 is controlled by the microcomputer 120, and the RTC 164 and/or the open/close sensor 142.

The main power switch 150 supplies power to the ROM 118, the μC 120, the flash memory 134, and the indicator 144 if the USB I/F 110 is connected to the USB port 49 of the information processing apparatus 40 or if the switch 166 is turned on and the main power switch 150 is powered from the battery and charger 160. The auxiliary power source 162 supplies power to the open/close sensor 142, the RTC 164, and the switch 166. The indicator 144 may be powered from the auxiliary power source 162 rather than from the main power switch 150.

The processor 42 in the information processing apparatus 40 operates under the control of programs (PRG_M stored in the storage device 44 and PRG_U in the ROM 118). The storage device 44 stores an administrator utility program (PRG_M) and/or a user utility program (PRG_U).

The user utility program (PRG_U) is read from the ROM 118 of the USB memory 100 onto the storage device 44 for storage when the USB memory 100 is connected to the information processing apparatus 40. The user utility program in the flash memory 134 includes a management program for user authenticating information processing apparatus authentication, and a file system construction of the USB memory 100.

The administrator utility program (PRG_M) includes a management program for administrator authenticating information, processing apparatus authentication, setting (addition, modification, and deletion) of the information processing apparatus that is permitted to access the USB memory 100, setting (addition, modification, and deletion) of the access deactivating policy, and a file system construction of the USB memory 100 in the flash memory 134. The access deactivating policy may include a rule, or a condition, and identifying information and/or a parameter of the access deactivating process. The input device 46 includes a keyboard, a pointing device, etc.

An authenticating processor 22 stores authenticating information, authenticates the user, authenticates the administrator, or authenticates one of the information processing apparatus and the terminal. Through an authenticating process, the connection of the USB memory 100 with the authorized information processing apparatus, and the use of the USB memory 100 by one of the authorized user and the administrator are detected. The CPU 122 stores the current time and day on the state information and log memory 36, as state information or log, event time and date of authentication or the like, time and date on which the USB memory 100 is connected to the server 20 via the information processing apparatus, time and date on which the USB memory 100 is opened or closed (e.g., opening and closing of the cap 102 or attaching and detaching of the strap 104), a count of consecutive user authenticating failures, a count of consecutive administrator authenticating failures, a count of consecutive authenticating failures of the information processing apparatus 40, battery remaining power, the state information, etc.

FIG. 4 represents an example of a format of a log stored on the internal flash memory 124 in the USB memory 100. The log includes an event time and date, a cause of a generation of access deactivation, an access deactivating method, and an applied threshold value. The causes of the access deactivation to the USB memory 100 include elapsed time from the last granted access, a count of password authenticating failures, low battery remaining power, etc. The access deactivating methods include a deletion of an encryption key, a partial deletion of a data, a deletion by overwriting of the flash memory 134, locking of the flash memory 134, function limitation such as a limitation to authenticating function, etc. Referring to FIG. 4, the encryption key is deleted because the battery power dropped to 2200 mV at 11:00, Feb. 28, 2009. The battery power is later down, causing the USB memory 100 to be defaulted to an initial state. The RTC (real-time clock) 164 is thus defaulted to the initial state in 2008.

Figure 3:
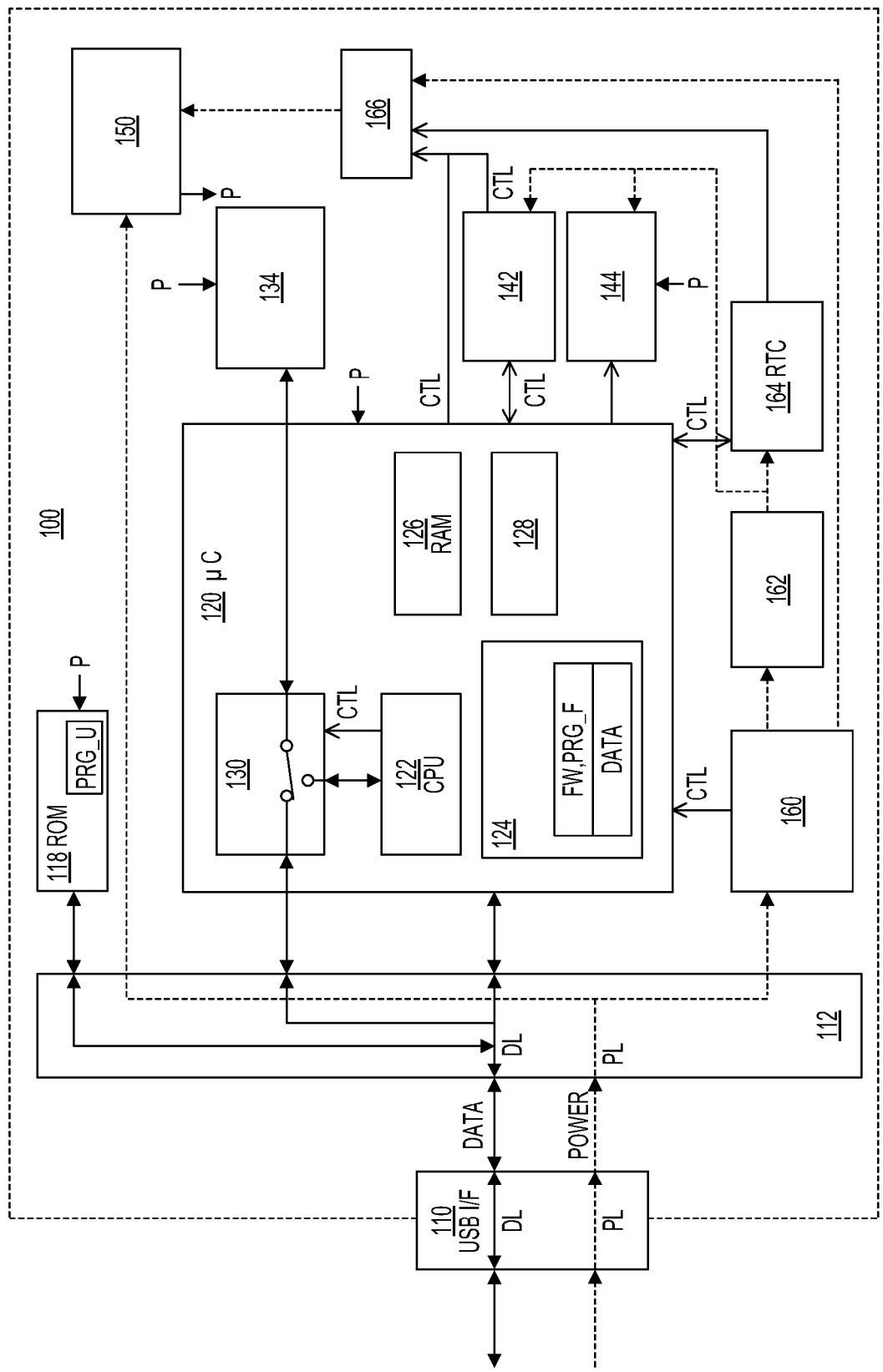
FIG. 3 is a block diagram diagrammatically depicting an example of a configuration and arrangement of a USB memory in accordance with another embodiment of the present invention.

FIG. 3 is a block diagram depicting an example of a configuration and arrangement of the USB memory 100 in accordance with another embodiment of the present invention.

Referring to FIG. 3, a hub switch 132 within the μC 120 is used in place of the hub switch 130 depicted in FIG. 2. The rest of the configuration, arrangement and operation of the USB memory 100 depicted in FIG. 3 are unchanged from the configuration and arrangement depicted in FIG. 2.

FIG. 5 is a functional block diagram depicting an example of a configuration and arrangement of major internal elements of the μC 120 depicted in FIGS. 2 and 3.

The μC 120 includes, as elements thereof, a policy evaluation unit 20, an authenticating processor 22, a command processor 24, an access deactivating policy memory 26 (setting information storing part), a time manager 28, and a state output unit 30. The microcomputer 120 further includes, as elements thereof, a selector 32 selecting for controlling the access deactivation, a deactivating processor 34, and a state information and log memory 36. The functions of these elements are implemented by FW (firmware) or a program PRG_F on the internal flash memory 124. The authenticating processor 22 includes an authenticating information memory. The authenticating information memory of the authenticating processor 22, the access deactivating policy memory 26, and the state information and log memory 36 are in the internal flash memory 124 in the microcomputer 120. Since the internal flash memory 124 is non-volatile, the firmware FW, the program PRG_F and the data thereon remain undeleted if the battery and charger 160 has no remaining power.

The deletion of the encryption key of a protecting process 1 by the access deactivating processor 34 is the deletion of a plurality of encryption keys stored on one of the internal flash memories 124 and 134. Each of the encryption keys is generated for an encrypted data file to be stored on the flash memory 134 and is then stored on one of the internal flash memories 124 and 134.

The access deactivating policy (the rule or the condition, and the access deactivating method) is stored on the access deactivating policy memory 26. In accordance with the access deactivating policy, the policy evaluation unit 20 judges based on the present time and day, the log, and the state information whether to protect the USB memory 100. More specifically, the policy evaluation unit 20 judges whether or not the deactivating process to access to each data file on the flash memory 134 in the USB memory 100 at each protection level is performed. If it is judged that the deactivating process is performed, the USB memory 100 is protected, the policy evaluation unit 20 controls the selector 32, thereby selecting the access deactivating method or protection method. The policy evaluation unit 20 thus deactivates accessing to the data on the flash memory 134, such as deleting the encryption key, deleting the data, limiting the function, or performing another operation.

The authenticating processor 22 sets authentication identifying information. In accordance with the authentication identifying information set by the administrator, the authenticating processor 22 authenticates the information processing apparatus permitted to be accessed, authenticates the administrator, authenticates the user, etc.

The command processor 24 executes a command received from the information processing apparatus 40. In response to the command, the command processor 24 stores the access deactivating policy set by the administrator on the access deactivating policy memory 26. That is, the access deactivating policy is the rule or condition thereof, and the identifying information and/or parameter representing the access deactivating method). The command processor 24 controls one of the hub switches 130 and 132. In response to the command, the command processor 24 causes the state output unit 30 to output the state information or the log to the information processing apparatus 40 via the USB I/F 110 and the USB hub 112.

The time manager 28 manages, sets, and controls the RTC 164 in response to a request or evaluation results from the policy evaluation unit 20.

Figure 6A:
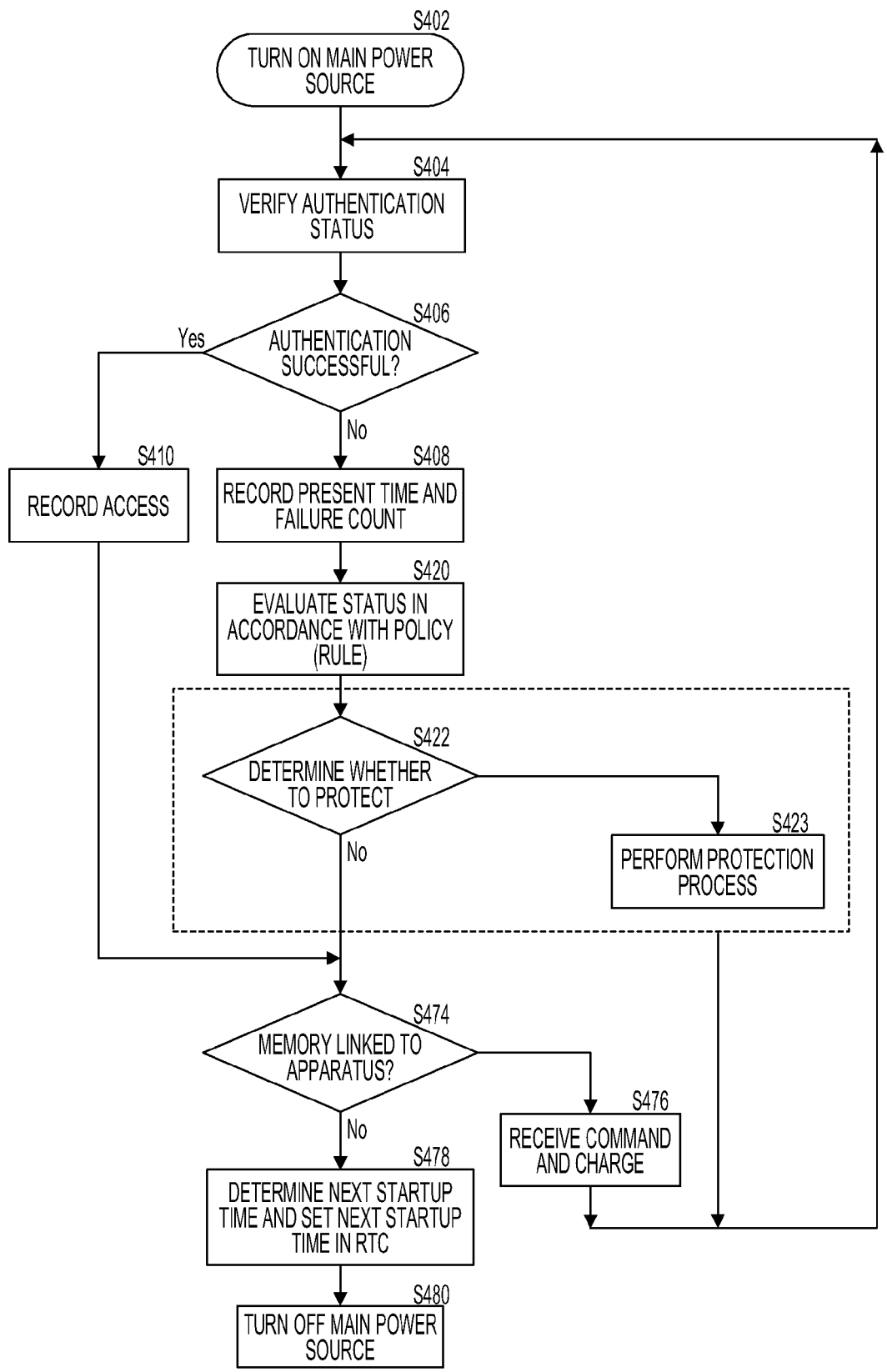
FIG. 6A represents an operation chart of an example of a policy evaluation process for data protection that is executed by a microcomputer of the USB memory if an authenticating processor results in an authenticating failure in an authenticating process thereof.

FIGS. 6A and 6B represent operation charts of a policy evaluation process the μC 120 of the USB memory 100 performs to protect data if any entity fails to be authenticated by the authenticating processor 22. FIG. 6B represents an operation chart representing in detail operations S422 and S423 in FIG. 6A.

In operation S402, the USB I/F 110 is connected to the USB port 49 of the information processing apparatus 40. The USB memory 100 is powered via the USB port 49 when the main power switch 150 is turned on. The main power switch 150 supplies power to the μC 120, the flash memory 134, and the indicator 144. Similarly, the main power switch 150 becomes operative if the main power switch 150 is powered from the battery and charger 160 with the switch 166 turned on. The μC 120 is switched on, causing the policy evaluation unit 20 to be operative.

When the USB I/F 110 of the USB memory 100 is inserted into the USB port 49 of the information processing apparatus 40, the processor 42 of the information processing apparatus 40 automatically reads the user USB memory utility program PRG_U (for management, authentication, file system configuration, etc.) stored on the ROM 118. A user authenticating screen for accessing the USB memory 100 is displayed on the display 48.

The administrator USB memory utility program PRG_M is stored on the storage device 44. The processor 42 of the information processing apparatus 40 executes the administrator USB memory utility program PRG_M in response to an operation inputted by the administrator. An administrator authenticating screen for accessing the USB memory 100 is displayed on the display 48.

The processor 42 of the information processing apparatus 40 supplies, to the USB memory 100, one of identifying information inputted thereto by one of the user and the administrator, and the authentication identifying information of the information processing apparatus 40 stored on the storage device 44. The μC 120 in the USB memory 100 as an authenticating processor 22 compares the received identifying information with the identifying information stored on one of the internal flash memories 124 and 134, thereby performing the device authenticating process of the information processing apparatus 40, the user authenticating process, and/or the administrator authenticating process.

If the authenticating processor 22 has judged that the authenticating process has been successfully completed, the command processor 24 receives a command from the information processing apparatus 40. In response to the command, the command processor 24 switches the hub switch 130 or 132 to the USB hub 112, thereby connecting the flash memory 134 to the USB hub 112, and to the USB port 49 of the information processing apparatus 40. Through this process, the processor 42 of the information processing apparatus 40 is accessible to a data file on the flash memory 134. In response to an operational input or a command entered by the user or the administrator, the processor 42 processes a data file on the flash memory 134 and/or adds a new data file onto the flash memory 134.

In operation S404, the policy evaluation unit 20 checks one of the present authentication status and authentication results of the authenticating processor 22. The policy evaluation unit 20 supplies, to the indicator 144, information indicative of the remaining time to the start of the first or subsequent access deactivating process and information indicative of the current battery remaining power, and the indicator 144 displays the information. The indication of the indicator 144 may be light emission of an LED in response to the information and/or an indication pattern (such as an LED color of a lighting LED, a continuous lighting of an LED, a long-period blinking of a lighting LED, or a short-period blinking of a lighting LED). In this way, the indicator 144 alerts the user to the access deactivation. In operation S406, the policy evaluation unit 20 judges, based on the current authentication state or the authentication results, whether the authenticating process has been successfully completed. If the policy evaluation unit 20 judges that the authenticating process has been successfully authenticated, processing proceeds to operation S410.

In operation S410, one of the policy evaluation unit 20 and the authenticating processor 22 (CPU 122) may record, as a log, time and date on which the flash memory 134 is accessed by one of the user the administrator and the information processing apparatus 40 (time and date of connection, time and date of opening detected by the open/close sensor 142, and time and date of closing detected by the open/close sensor 142). One of the policy evaluation unit 20 and the authenticating processor 22 deletes the state information and a record of an authenticating failure on the log of the state information and log memory 36 and resets the state information and log memory 36.

If the authenticating process is not successfully completed in operation S406, one of the policy evaluation unit 20 and the authenticating processor 22 records, as a log, present time and date and the authenticating failure count in operation S408. Processing proceeds to operation S420.

In operation S420, the policy evaluation unit 20 accesses the access deactivating policy memory 26, the state information and log memory 36, and the real-time clock 164, or the state information and log memory 36. In accordance with the access deactivating policy (the rule and condition (cause and threshold value)) set by the administrator or the user, the policy evaluation unit 20 judges and evaluates, based on the present time and date, the state of the USB memory 100 or the log.

In operation S422, the policy evaluation unit 20 judges whether to protect the data file on the flash memory 134 based on the evaluation results. If the policy evaluation unit 20 judges that the data file is to be protected, processing proceeds to operation S423. If the policy evaluation unit 20 judges that the data file is not to be protected, processing proceeds to operation S474.

In operation S423, the policy evaluation unit 20 controls the selector 32 thereby executing a given protecting process. Processing returns to operation S404.

In operation S474, the policy evaluation unit 20 judges whether or not the USB memory 100 is currently connected to the information processing apparatus 40. If the policy evaluation unit 20 judges that the USB memory 100 is currently connected to the information processing apparatus 40, the command processor 24 receives a command from the USB memory 100 and continuously charges the battery and charger 160 in operation S476. Processing returns to operation S404.

If the policy evaluation unit 20 judges in operation S474 that the USB memory 100 is not connected to the information processing apparatus 40, the policy evaluation unit 20 references the access deactivating policy memory 26 for the access deactivating policy in operation S478. In response to the cause and the threshold value for time in each access deactivating policy, the policy evaluation unit 20 determines start times of a next policy evaluation and a policy evaluation subsequent thereto, and then supplies the start times to the time manager 28. For example, if a given time threshold value farthest away is 3×24 hours from time measurement start time, the start time of policy evaluation may be set at elapsed times of, for example, 24 hours, 48 hours, 60 hours, 66 hours, 69 hours, and 72 hours. In response to the policy evaluation start time of the policy evaluation unit 20, the time manager 28 determines a next start time and date of the main power switch 150, and then sets that time on the RTC 164.

The policy evaluation unit 20 displays, on the indicator 144, the information indicative of the remaining time to the start of the first or subsequent access deactivating process and the information indicative of the current battery remaining power. The policy evaluation unit 20 may display the information always or when the USB memory 100 is connected to the information processing apparatus 40. In operation S480, the policy evaluation unit 20 makes the time manager 28 turn off the main power switch 150. Processing returns to the routine of FIG. 6A.

As depicted in operation S424 subsequent to operation S420 in FIG. 6B, the policy evaluation unit 20 judges whether the protecting process has not yet been performed under the rule of policy 1 (and the deactivation information thereof) and judges whether the current state of the USB memory 100 satisfies the rule of the policy 1 on the access deactivating policy memory 26. The rule of policy 1 is that the encryption key stored on the internal flash memory 124 or 134 for use with the data file on the flash memory 134 is to be deleted if an elapsed time from the last access time permitted through authentication or an elapsed time from the closing time of the USB memory 100 exceeds a threshold value (parameter) of 24 hours. If it is judged in operation S424 that the protecting process has been performed under the rule of the policy 1 or that the rule or the condition of the policy 1 is not satisfied, processing proceeds to operation S434.

If the policy evaluation unit 20 judges, in operation S424, that the rule or the condition of the policy 1 is satisfied, the policy evaluation unit 20 temporarily locks the USB hub 112 to prevent accessing to the USB memory 100 in operation S426. More specifically, the policy evaluation unit 20 causes the hub switch 130 or 132 to switch the connection of the flash memory 134 from the USB hub 112 to the μC 120. The policy evaluation unit 20 causes the selector 32 to select protecting process 1 deleting the encryption key of the access deactivating processor 34, and thus deletes all the encryption keys on the internal flash memory 124 or 134 for the data files. Processing proceeds to operation S470.

In operation S434, the policy evaluation unit 20 judges whether or not a protecting process has been performed under the rule of policy 2 and judges whether or not the current state of the USB memory 100 satisfies the rule or the condition of the policy 2. The rule of policy 2 is that a file table existing in a data file or a part of the files on the flash memory 134 is to be deleted if the time elapsed from the last access time permitted or the time elapsed from the closing time of the USB memory 100 exceeds a threshold value (parameter) of 48 hours. The part of files may include an encrypted file, or a new file having date of production or date of update being less than one month. If it is judged in operation S434 that the protecting process has been performed under the rule of the policy 2 or that the rule or the condition of the policy 2 is not satisfied, processing proceeds to operation S444.

If a part of the files is deleted on the flash memory 134, the accessing to the part of the files becomes difficult.

If the policy evaluation unit 20 judges in operation S434 that the rule or the condition of the policy 2 is satisfied, the policy evaluation unit 20 temporarily locks the USB hub 112 in operation S436. The policy evaluation unit 20 causes the selector 32 to select a protecting process 2 of the access deactivating processor 34, and then deletes the file table or the part of the files on the flash memory 134. Processing proceeds to operation S470.

If the file table or the part of the files is deleted on the flash memory 134, the accessing to the file table or the part of the files becomes difficult.

In operation S444, the policy evaluation unit 20 judges whether or not a protecting process has been performed under the rule of the policy 3 and judges whether or not the current state of the USB memory 100 satisfies the rule or the condition of the policy 3. The rule of policy 3 is that all the data on the flash memory 134 is to be deleted if the elapsed time from the last access time permitted or the elapsed time from the closing time of the USB memory 100 exceeds a threshold value (parameter) of 5 days (5×24 hours). If it is judged in operation S444 that the protecting process has been performed under the rule of the policy 3 or that the rule or the condition of the policy 3 is not satisfied, processing proceeds to operation S454.

If the policy evaluation unit 20 judges in operation S444 that the rule or the condition of the policy 3 is satisfied, the policy evaluation unit 20 temporarily locks the USB hub 112 in operation S446. The policy evaluation unit 20 causes the selector 32 to select a protecting process 3 of the access deactivating processor 34, and then overwrite-deletes all the data (other than the log) on the flash memory 134. Processing proceeds to operation S470.

Once all the data is overwrite-deleted on the flash memory 134, the restoring of the data is difficult even if the data is technically analyzed. The accessing to the data on the USB memory 100 (the flash memory 134) becomes difficult.

In operation S454, the policy evaluation unit 20 judges whether a protecting process has been performed under the rule of a policy 4 and judges whether or not the current state of the USB memory 100 satisfies the rule or the condition of the policy 4. The rule of policy 4 is that the USB hub 112 is permanently locked if the elapsed time from the last access time permitted or the elapsed time from the closing time of the USB memory 100 exceeds a threshold value (parameter) of 6 days (6×24 hours). If it is judged in operation S454 that the protecting process has been performed under the rule of the policy 4 or that the rule or the condition of the policy 4 is not satisfied, processing proceeds to operation S464.

If the policy evaluation unit 20 judges in operation S454 that the rule or the condition of the policy 4 is satisfied, the policy evaluation unit 20 permanently locks the USB hub 112 in operation S456. The policy evaluation unit 20 causes the hub switch 130 or 132 to switch the connection of the flash memory 134 from the USB hub 112 to the μC 120. Processing proceeds to operation S470.

With the USB hub 112 permanently locked, only the authorized administrator is allowed to access the flash memory 134.

In operation S464, the policy evaluation unit 20 judges whether or not a protecting process has been performed under the rule of a policy 5 and judges whether or not the current state of the USB memory 100 satisfies the rule or the condition of the policy 5. The rule of policy 5 is that all the data is to be overwrite-deleted on the flash memory 134 and a part of the function, such as the authenticating function, of the internal flash memory 124, is to be suspended if the elapsed time from the later access time permitted or the elapsed time from the closing time of the USB memory 100 exceeds a threshold value (parameter) of 7 days (7×24 hours). If it is judged in operation S464 that the protecting process has been performed under the rule of the policy 5 or that the rule or the condition of the policy 5 is not satisfied, processing proceeds to operation S474 of FIG. 6A.

If the policy evaluation unit 20 judges in operation S464 that the rule or the condition of the policy 5 is satisfied, the policy evaluation unit 20 temporarily locks, in operation S466, the USB hub 112 if in an unlocked state. If the USB hub 112 is already locked, the policy evaluation unit 20 maintains the USB hub 112 in a temporally locked state. The policy evaluation unit 20 causes the hub switch 13 to select a protecting process 5 on the access deactivating processor 34 and overwrite-deletes all the data (other than the log) on the flash memory 134. The policy evaluation unit 20 further partially deletes or overwrites a part of the function of the internal flash memory 124, such as the FW (firmware) of the authenticating function and the program PRG_F. If it is judged in operation S466 that the protecting process has been completed, processing proceeds to operation S470.

When the authenticating function of the authenticating processor 22 stops, the command processor 24 does not receive any command from the information processing apparatus 40. The accessing the data on the flash memory 134 becomes difficult, and the use of the USB memory 100 is not permitted.

Similarly, the policy evaluation unit 20 may judge another access deactivating policy on the access deactivating policy memory 26 and execute a corresponding protecting process. The rule may be that a file table in a data file, a part of the files, or all the data is to be overwrite-deleted on the flash memory 134 if the elapsed time from the connection of the USB memory 100 to the information processing apparatus 40 to the authentication of an authorized user exceeds a threshold value (parameter) of 12 hours and the user authenticating failure occurs consecutively 5 times. The rule may be that a file table in a data file, a part of the files, or all the data is to be overwrite-deleted on the flash memory 134 if the battery and charger 160 has a remaining battery power of 2200 mV (milli-Volt) or lower and the user authenticating failure occurs consecutively 5 times.

In operation S470, the policy evaluation unit 20 stores the state of the USB memory 100 resulting from the protecting process onto the state information and log memory 36 as the state information. If the lock of the protecting process is temporary, the policy evaluation unit 20 cancels the locked state of the USB hub 112 via the selector 32. More specifically, the policy evaluation unit 20 may cause the hub switch 130 or 132 to cancel the force-connected state of the flash memory 134 to the μC 120. The hub switch 130 or 132 enables the flash memory 134 to be connectable to the USB I/F 110. If the lock of the protecting process is permanent (policy 4), the policy evaluation unit 20 does not cancel the locked state.

FIG. 7A represents an example of a format of the access deactivating policy. FIG. 7B represents an example of a definition of a value of a cause of the access deactivation in the format of FIG. 7A. FIG. 7C represents an example of a definition of a value of the access deactivating method in the format of FIG. 7A.

The format of the access deactivating policy represented in FIG. 7A includes a cause (1 byte) of the access deactivation, the access deactivating method (1 byte), and a threshold value causing the access deactivation (4 bytes). The threshold value is related to the cause of the access deactivation.

Referring to FIG. 7B, the cause items of the access deactivation include elapsed time from last authorized access, remaining battery power, a device authenticating failure count, a user authenticating failure count of the information processing apparatus, an administrator authenticating failure count, the time from the start of the connection of the USB memory 100 to the information processing apparatus to the completion of the authentication of the information processing apparatus (successful authentication), an access deactivation command from the user, elapsed time from the opening of the cap 102 or the strap 104 detected by the open/close sensor 142, etc. The elapsed time from the closing of the cap 102 or the strap 104 detected by the open/close sensor 142 may be used as the cause of the access deactivation. The cause items of the access deactivation may include the elapsed time from the physical opening or closing of one of the cap 102 and the strap 104 detected by the open/close sensor 142. For example, the elapsed time may be from the time at which the user opened the last one of the cap 102 and the strap 104, or from the time at which the user closed the last one of the cap 102 and the strap 104.

The accessing to the data one the USB memory 100 is deactivated at different levels in response to the elapsed time. Even if an unauthorized user attempts to access the USB memory 100 at a variety of methods using his or her sufficient time, the chance of an unauthorized access to the data on the USB memory 100 is lowered or eliminated. If the elapsed time is equal to or shorter than a given threshold value, the authorized user may use the USB memory 100 through correct authentication. The user friendliness of the USB memory 100 is thus maintained.

As the elapsed time increases, the range of data deletion of the data on the USB memory 100 is extended. Data leak is thus prevented. This arrangement minimizes the inconvenience that even an authorized user is prohibited from using the USB memory 100 during the time lasting from a deletion operation to a resume operation. If the elapsed time is relatively short, the range of the data to be deleted from the USB memory 100 is narrowed so that a time period from the deletion operation to the resume operation is short.

The accessing to the data on the USB memory 100 is deactivated at different levels depending on the authenticating failure count. Even if an unauthorized user attempts to access the USB memory 100 for a number of times of authentication, the chance of an unauthorized access to the data on the USB memory 100 is lowered or eliminated. If the number of consecutive authenticating failures is equal to or smaller than a given threshold value, an authorized user may use the USB memory 100 through correct authentication. The user friendliness of the USB memory 100 is maintained.

Referring to FIG. 7C, the access deactivating method includes data overwrite deletion, data partial deletion, file list deletion, the locking of the flash memory 134 (the hub switches 130 and 132), deletion of the encryption key, function limitation, etc.

FIG. 8A represents an example of a table listing access deactivating methods for the elapsed times as causes, and threshold values. FIG. 8B represents an example of a table of the set access deactivating methods and the threshold values. In these cases, the causes are all elapsed time.

The contents (conditions (causes and thresholds)) of several items (rows) in the table of FIG. 8A are selected and set on the USB memory 100 (the internal flash memory 124 and the access deactivating policy memory 26). Several items of the plurality of items on FIG. 8A are selected in FIG. 8B.

For example, if the content of item 1 (the condition and the access deactivating method) in FIG. 8A is set, the data of the flash memory 134 is deleted by overwriting (overwrite-deletion) at the moment the elapsed time reaches 120 hours. If the content of item 2 (the condition and the access deactivating method) in FIG. 8A is set, the data of the flash memory 134 is overwrite-deleted and the flash memory 134 is locked by the hub switch 130 or 132 at the moment the elapsed time reaches 144 hours. If the content of item 3 (the condition and the access deactivating method) in FIG. 8A is set, the data of the flash memory 134 is overwrite-deleted, the encryption key is deleted, and the function is limited at the moment the elapsed time reaches 150 hours. The function limitation may be a partial deletion or an overwriting of the function of the FM (firmware) of the internal flash memory 124 or of the function of the utility program PRG_F.

With a plurality of access deactivating modes described above, the USB memory 100 or the data thereof is protected at different levels depending on the cause. When it is likely that an authorized user accesses the data on the USB memory 100, the possibility of accessing to the data is set to be high. When it is likely that an unauthorized user accesses the data on the USB memory 100, the level of protection of data is increased. By protecting data at a different level depending on the type of data, highly secret data is heavily protected, and data having a modest level of secrecy is lightly protected. The user friendliness of the USB memory 100 is maintained.

Figure 9:
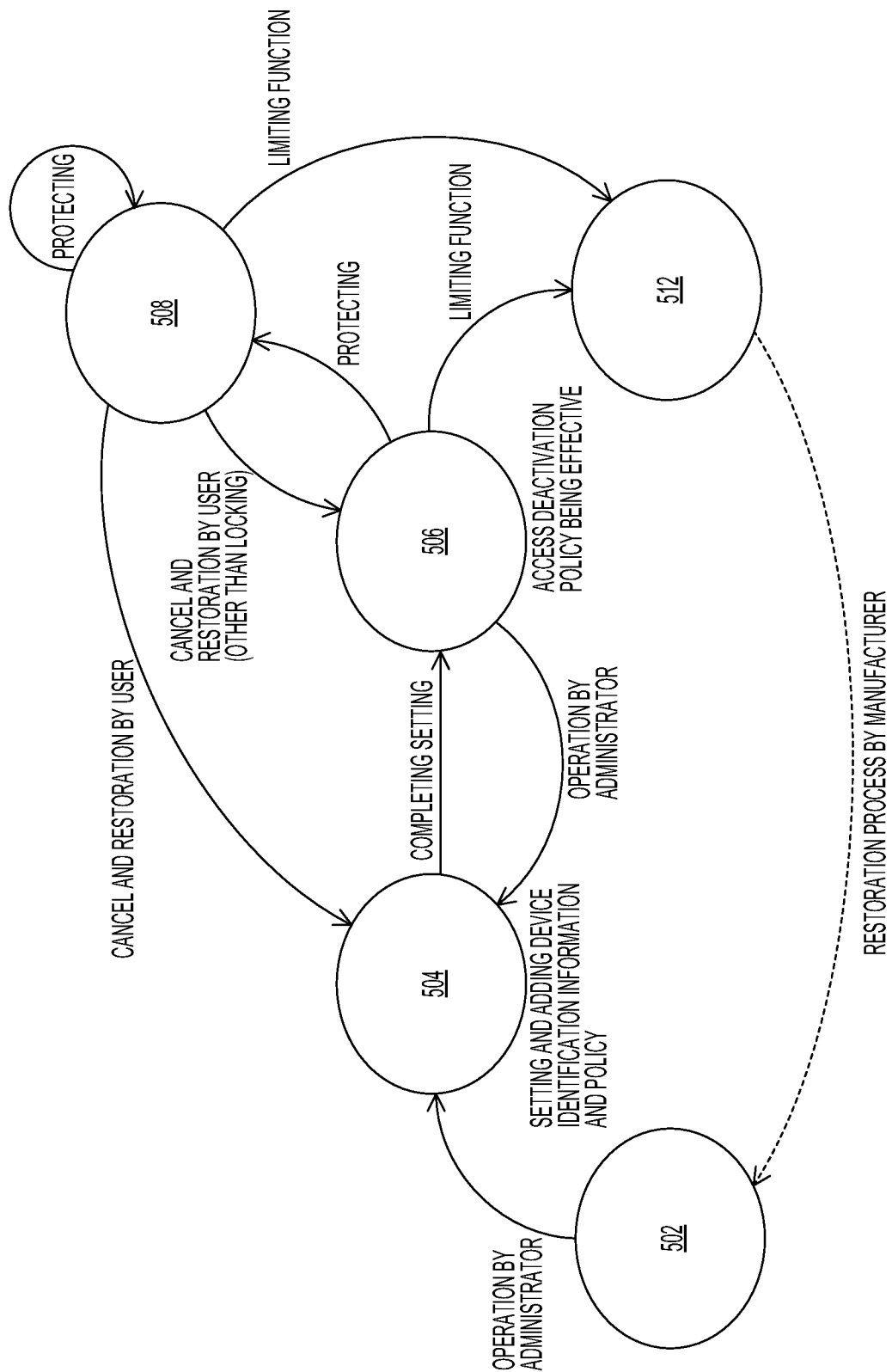
FIG. 9 depicts an example of a state transition chart of the microcomputer of the USB memory.

FIG. 9 is a state transition chart depicting the states taken by the microcomputer 120 in the USB memory 100.

The USB memory 100 operates in a default mode 502 at the state of the shipment. The administrator or the privileged user connects the USB memory 100 to the USB port 49 of the information processing apparatus 40, and inputs and sets given identifying information or a password of the administrator on the USB memory 100. The USB memory 100 makes a transition to an administrator mode 504.

In the administrator mode 504, the administrator operates the information processing apparatus 40 in order to set, add, or modify, on the USB memory 100, device identifying information of the information processing apparatus 40 permitted to access, identifying information of the user permitted to access, and an access deactivating policy. The access deactivating policy is defined by the rule or the condition (cause and threshold value), and identifying information and/or parameter representing the deactivating method. If the administrator has set, added, or modified the device identifying information, the access deactivating policy, etc. in the administrator mode 504, the USB memory 100 returns to a standard mode 506. With the USB memory 100 in the standard mode 506, the access deactivating policy is validated.

In the standard mode 506, the user may access the flash memory 134 by connecting the USB memory 100 to the information processing apparatus 40. More specifically, the user may open an effective data file on the flash memory 134, add a new data file on the flash memory 134, and delete the USB memory 100.

If a state in which the access deactivating policy (the rule or the condition, and the access deactivating method) is to be applied is created in the standard mode 506, the USB memory 100 executes a protecting process for the access deactivation to transition to an access deactivating mode 508. If the access deactivation results in the function limitation of the USB memory 100, the USB memory 100 transitions to a function limitation mode 512.

In the access deactivating mode 508, a plurality of other access deactivation policies remain continuously effective. If a state in which another access deactivating policy (the rule or the condition, and the access deactivating method) is to be applied is created in the access deactivating mode 508, the USB memory 100 executes another protecting process for the access deactivation to maintain the access deactivating mode 508. The states possible in the access deactivating mode 508 include an encryption key deleted state, a data file deleted state, a data deleted state, a locked state, etc. If the access deactivation results in the function limitation of the USB memory 100, the USB memory 100 makes a transition to a function limitation mode 512.

If the administrator connects the USB memory 100 to the USB port 49 of the information processing apparatus 40 with a successful authenticating process in the access deactivating mode 508, the access deactivating mode 508 is canceled. If the USB memory 100 remains locked as a result of the protecting process, the administrator cancels the locked state through the authenticating process. The USB memory 100 updates the state information and the log thereof, and transitions to the administrator mode 504. If the administrator cancels the locked state or completes a restoring process, the USB memory 100 makes a transition to a standard mode 506.

The protecting process may delete at least part of the data, and the encryption key. As a result, a part of the data files may be inaccessible, or may be deleted. If all the data is overwrite-deleted on the flash memory 134, the administrator may reconstruct a file system using the administrator USB memory utility program PRG_M.

The user connects the USB memory 100 to the USB port 49 of the information processing apparatus 40 with a successful authenticating process in the access deactivating mode 508, and the access deactivating mode 508 is canceled. The USB memory 100 then updates the state information and the log thereof, thereby transitioning to the standard mode 506.

The protecting process may cause the USB memory 100 to be locked, at least one part of the data to be deleted, one part of the data files to be inaccessible, or one part of the data files to be deleted. If the protecting process causes the USB memory 100 to be in the locked state, only the administrator may be allowed to cancel the locked state, but the user may not be allowed to cancel the locked state. If all the data is overwrite-deleted on the flash memory 134, the user may reconstruct the file system using the firmware utility program of the internal flash memory 124.

If the administrator has connected the USB memory 100 to the USB port 49 of the information processing apparatus 40 with a successful authenticating process in the standard mode 506, the USB memory 100 transitions to the administrator mode 504. The device identifying information, the access deactivating policy, etc. may be set, added, or modified on the USB memory 100. The log of the USB memory 100 is thus updated.

If a function limitation occurs in one of the access deactivating mode 508 and the standard mode 506, the USB memory 100 makes a transition to the function limitation mode 512. Even if the user or the administrator attempts to connect the USB memory 100 to the USB port 49 of the information processing apparatus 40 in the function limitation mode 512 for authentication, the USB memory 100 accepts neither one of an authentication and a new command.

If an operator having the manufacturer's right cancels the function limitation of the USB memory 100 in the function limitation mode 512 to perform the restoring process, the USB memory 100 operates in the default mode 502. The restoring process may be the process performed by the FW of the internal flash memory 124 or the utility program PRG_F.

Figure 10:
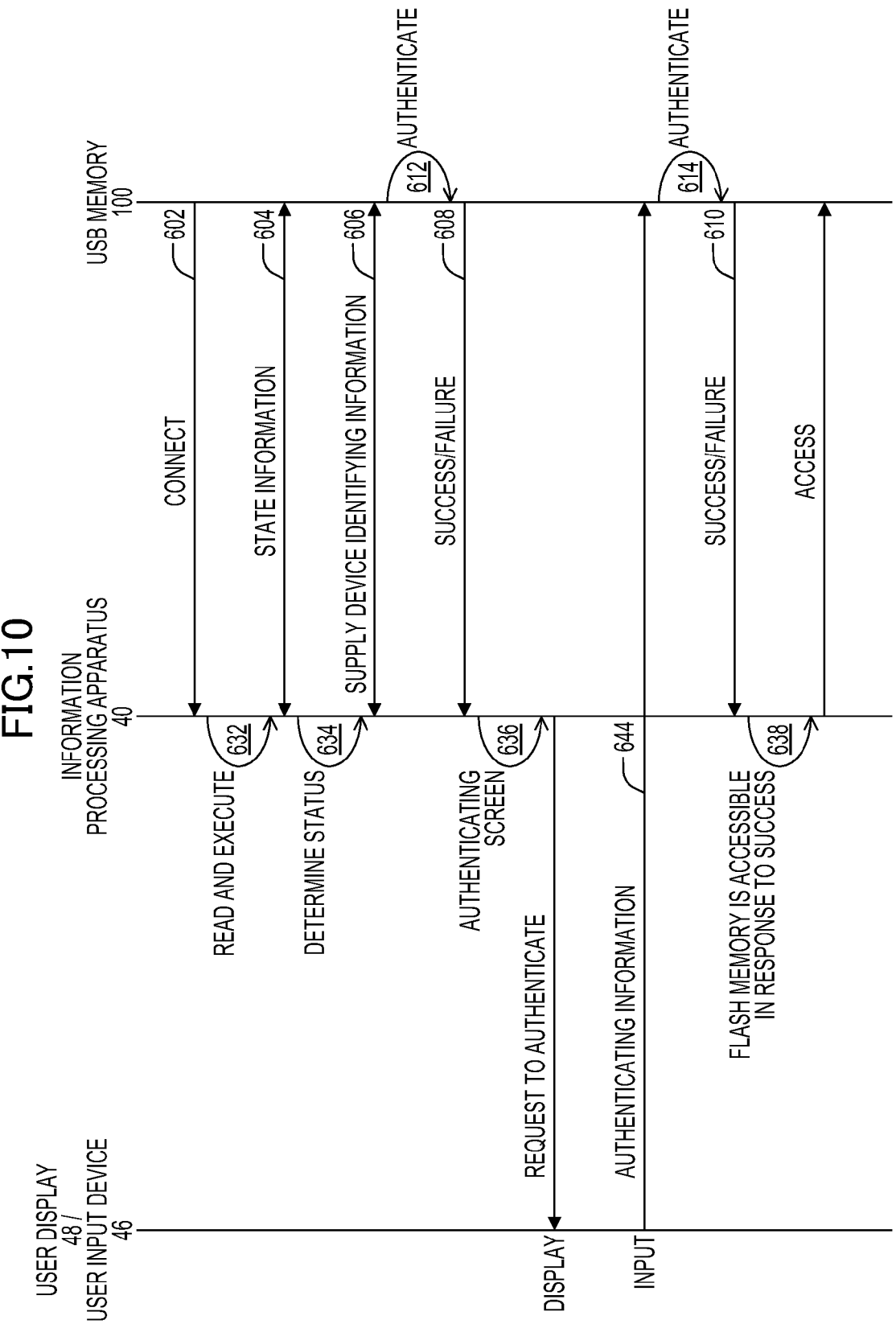
FIG. 10 represents an example of a process performed between the information processing apparatus and the USB memory.

FIG. 10 represents a process performed between the information processing apparatus 40 and the USB memory 100.

If the user connects the USB memory 100 to the information processing apparatus 40 in operation 602, the user USB memory utility program PRG_U is executed in operation 632. If the user USB memory utility program PRG_U is not installed on the information processing apparatus 40, the information processing apparatus 40 (the processor 42) may automatically read or call from the USB memory 100 (ROM 118) the user USB memory utility program PRG_U and execute the program PRG_U. In operation 604, the information processing apparatus 40 retrieves the state information from the USB memory 100.

In operation 634, the information processing apparatus 40 determines the operation state of the USB memory 100 based on the acquired state information, thereby judging whether the USB memory 100 is in the standard mode or the access deactivating mode. If the USB memory 100 is in the standard mode or the access deactivating mode, the information processing apparatus 40 supplies, to the USB memory 100, the device identifying information thereof (such as ID of basic input/output system and trusted platform module (BIOS/TPM)).

The CPU 122 verifies the device identifying information of the information processing apparatus 40, thereby authenticating the information processing apparatus 40 in operation 612. The CPU 122 supplies authentication results (success or failure) to the information processing apparatus 40 in operation 608. If the authentication results are a failure, the USB memory 100 and the information processing apparatus 40 end the process thereof.

If the authentication results are a success, the information processing apparatus 40 displays a user authenticating screen on the display 48, and requests authenticating information to be input in operation 636. The user operates the input device 46, thereby inputting the user authenticating information. In operation 644, the authenticating information is supplied from the information processing apparatus 40 to the USB memory 100.

In operation 614, the USB memory 100 (CPU 122) verifies the authenticating information, thereby authenticating the user. In operation 610, the USB memory 100 supplies, to the information processing apparatus 40, the authentication results. If the authentication results are a success, the information processing apparatus 40 is permitted to access the flash memory 134 in the USB memory 100 in operation 638. If the authentication results are a failure, the USB memory 100 and the information processing apparatus 40 end the process thereof.

Figure 11:
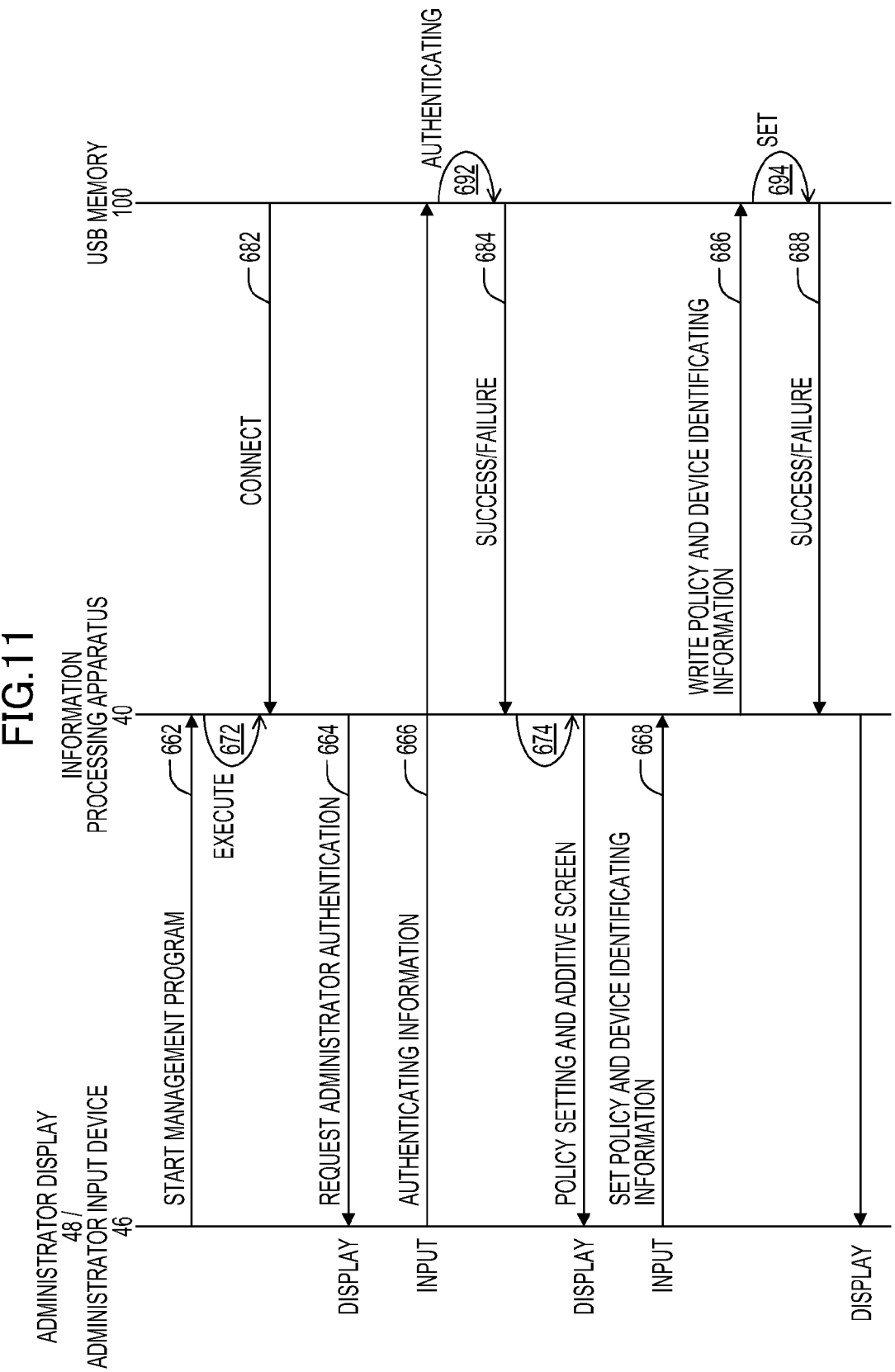
FIG. 11 represents an example of another process performed between the information processing apparatus and the USB memory.

FIG. 11 illustrates another process performed between the information processing apparatus 40 and the USB memory 100.

In operation 662, the administrator operates the information processing apparatus 40, thereby starting the administrator USB memory utility program PRG_M on the information processing apparatus 40. In operation 672, the information processing apparatus 40 executes the administrator USB memory utility program PRG_M.

In operation 682, the USB memory 100 is connected to the information processing apparatus 40. In operation 664, the information processing apparatus 40 displays an administrator authenticating screen on the display 48, and requests the authenticating information to be input. The administrator operates the input device 46 to input administrator authenticating information. Before the administrator authenticating screen is displayed, the USB memory 100 may receive the device identifying information from the information processing apparatus 40, authenticate the information processing apparatus 40, and supply the authentication results (success or failure) to the information processing apparatus 40. In operation 666, the authenticating information is supplied from the information processing apparatus 40 to the USB memory 100.

In operation 692, the USB memory 100 (CPU 122) verifies the authenticating information, thereby authenticating the user. In operation 684, the CPU 122 supplies the authentication results to the information processing apparatus 40. If the USB memory 100 is transitioned to the administrator mode after the user is successfully authenticated, the information processing apparatus 40 displays on the display 48 a screen for setting, adding, or modifying the access deactivating policy (the rule or the condition (cause and threshold value) and the access deactivating method). If the user is not successfully authenticated by the USB memory 100, the USB memory 100 and the information processing apparatus 40 end the process thereof.

In operation 668, the administrator operates the information processing apparatus 40 to input on the screen of the display 48 the device identifying information of the information processing apparatus 40 to be permitted to access, and the access deactivating policy.

In operation 686, the information processing apparatus 40 (the processor 42) writes, on the USB memory 100, the device identifying information and the access deactivating policy (the rule or the condition and the identifying information and/or parameter representing the deactivating method). The CPU 122 sets the received device identifying information and the access deactivating policy (the rule or the condition and the identifying information and/or parameter representing the deactivating method). In operation 688, the USB memory 100 transmits the setting results (success or failure) to the information processing apparatus 40. The information processing apparatus 40 displays the setting results on the display 48.

The device identifying information and the access deactivating policy (the rule or the condition and the identifying information and/or parameter representing the deactivating method) are set, added, or modified on the USB memory 100 in this way.

Figure 12:
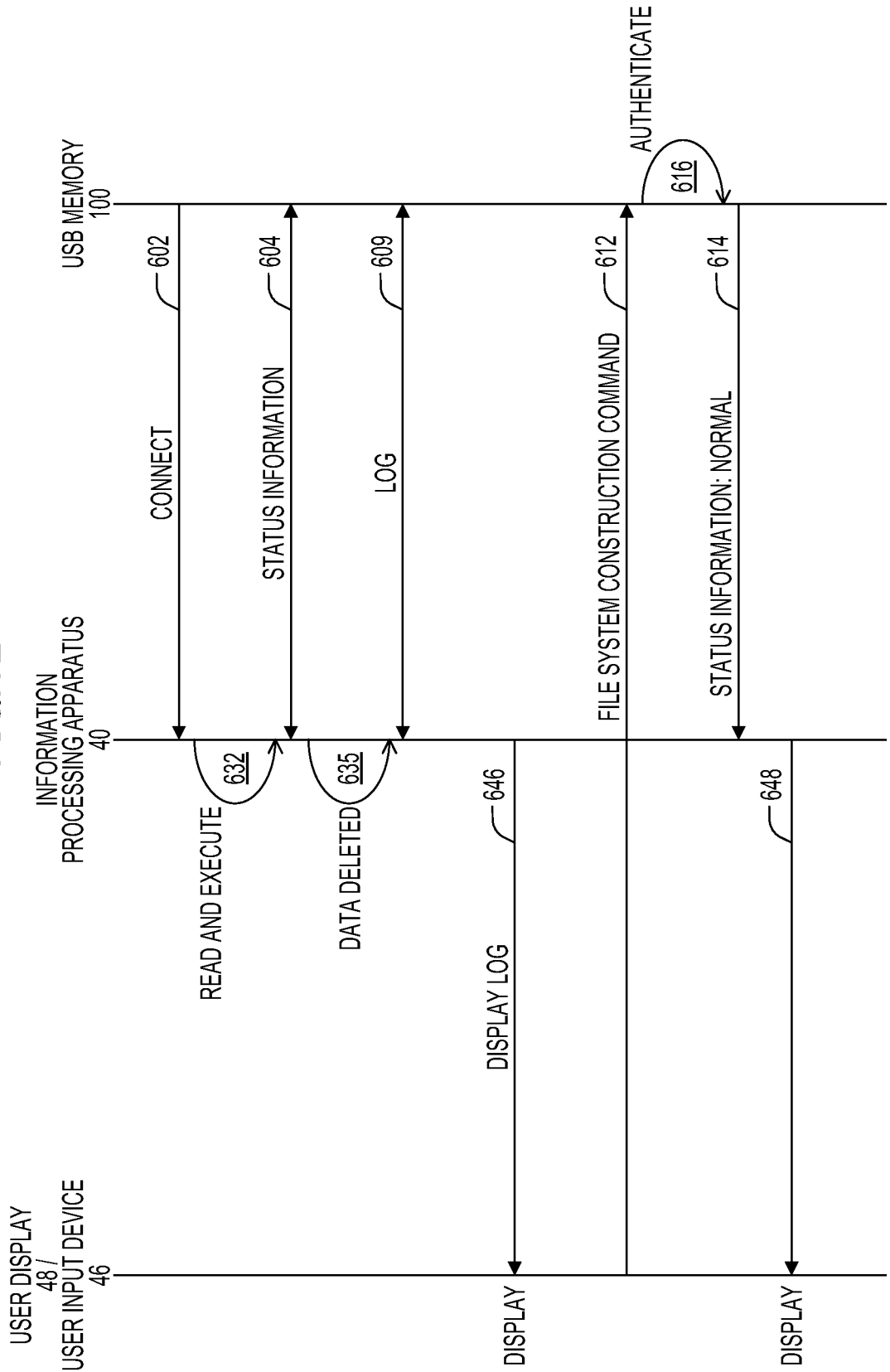
FIG. 12 represents an example of a restoring process of the USB memory performed between the information processing apparatus and the USB memory.

FIG. 12 represents a restoring process of the USB memory 100 performed between the USB memory 100 and the information processing apparatus 40.

Operations S602, 632, and 604 are similar to the operations depicted in FIG. 10.

If the information processing apparatus 40 (the processor 42) judges in operation 635 that the USB memory 100 is in the access deactivating mode 508 and that the data on the flash memory 134 has been all deleted, the information processing apparatus 40 retrieves the log from the USB memory 100 (the state output unit 30) in operation 609.

In operation 646, the information processing apparatus 40 displays, on the display 48, the present mode and state and the retrieved log. In operation 612, the user operates the information processing apparatus 40 to input a reconstruction command of the file system to the information processing apparatus 40. The information processing apparatus 40 supplies the reconstruction command of the file system to the USB memory 100.

In operation 616, the CPU 122 verifies the authenticity of the device identifying information and the command of the USB memory 100. If the command is authentic, the CPU 122 reconstructs the file system of the flash memory 134. In operation 614, the USB memory 100 supplies the present state (normal) to the information processing apparatus 40. In operation 648, the information processing apparatus 40 displays, on the display 48, the present state (normal) and the file list of the flash memory 134 (e.g., a file list having no file identifying information).

The file system of the flash memory 134 is thus reconstructed, and the accessing to the USB memory 100 is enabled.

Figure 13:
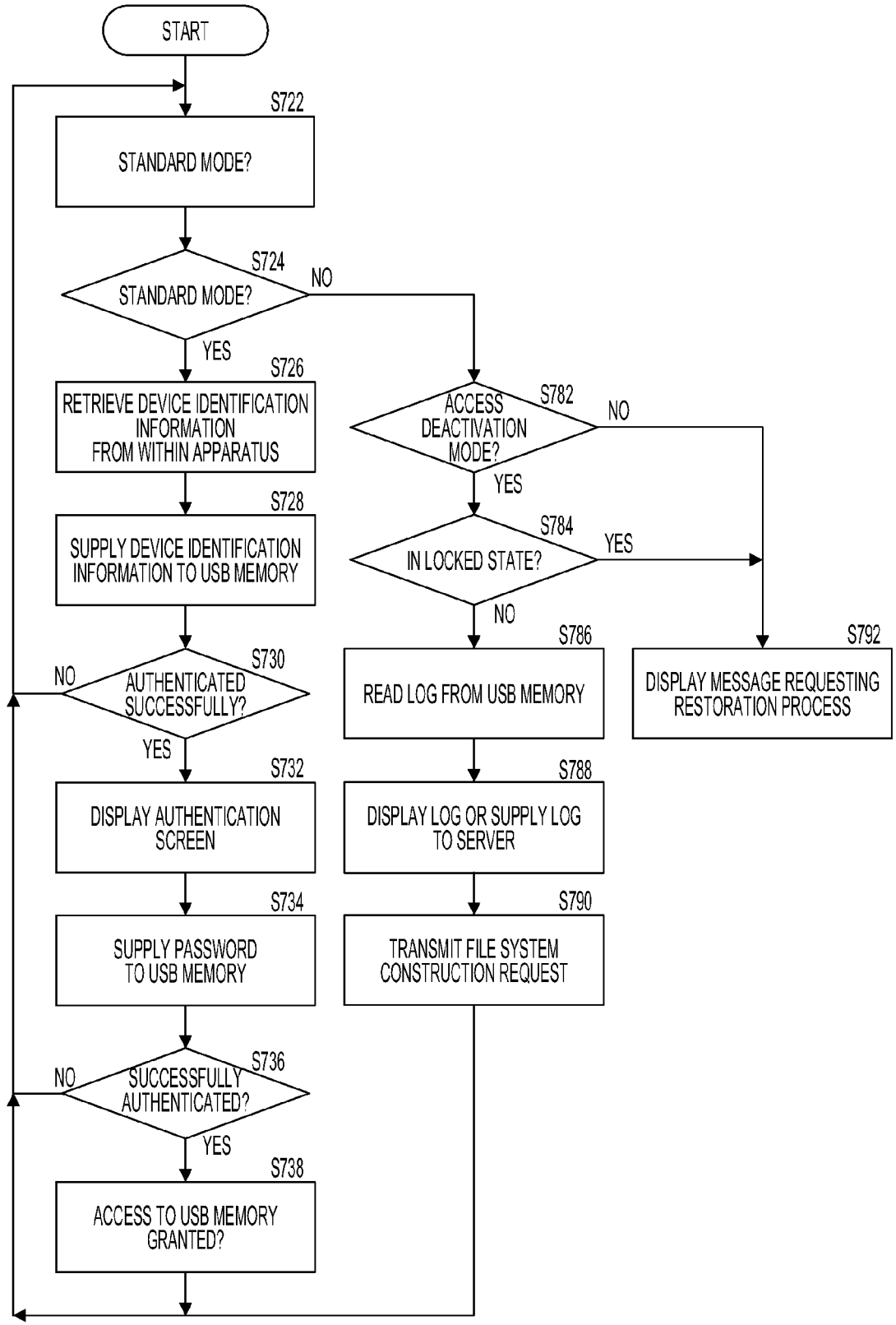
FIG. 13 represents an operation chart of a process that a processor of the information processing apparatus performs to authenticate a user and constructs a file system in accordance with a user USB memory utility program.

FIG. 13 is an operation chart representing a user authentication and file system construction process that the processor 42 of the information processing apparatus 40 executes in accordance with the user USB memory utility program PRG_U. When the USB memory 100 is connected to the USB port 49 of the information processing apparatus 40 via the USB I/F 110, the processor 42 calls and executes the user USB memory utility program PRG_U on the ROM 118.

In operation S702, the processor 42 of the information processing apparatus 40 retrieves the present state information (FIG. 9) of the USB memory 100 from the USB memory 100.

In operation S704, the processor 42 judges whether retrieved state information is in the "standard mode." If the processor 42 judges that the retrieved state information indicates the "standard mode," the processor 42 retrieves in operation S726 the device identifying information of the information processing apparatus 40 stored on the storage device 44 of the information processing apparatus 40.

In operation S728, the processor 42 supplies, to the USB memory 100, the device identifying information for authentication, and receives the device authentication results from the USB memory 100.

In operation S730, the processor 42 judges whether the device authenticating process has been successfully completed in response to the received authentication results. If it is judged that the device authentication has failed, processing returns to operation S702.

If it is judged in operation S730 that the device authentication has been successfully completed, the processor 42 displays, in operation S732, a display screen for user authentication in order to prompt the user to enter the ID and the password.

In operation S734, the processor 42 supplies the input ID and password to the USB memory 100, and receives the user authentication results from the USB memory 100.

In operation S736, the processor 42 judges, based on the received authentication results, whether the user has been successfully authenticated. If the user has not been successfully authenticated, processing returns to operation S702.

If it is judged in operation S736 that the user has been successfully authenticated, the processor 42 permits the user to access the USB memory 100, and then displays a folder and a list of files within the USB memory 100 in operation S738.

If it is judged, in operation S704, that the state information does not indicate the standard mode, the processor 42 judges, in operation S782, whether the retrieved state information indicates the access deactivating mode. If it is judged that the retrieved state information indicates the access deactivating mode, the processor 42 judges, in operation S748, whether the state information indicates the locked state.

If it is judged, in operation S784, that the state information does not indicate the locked state, the processor 42 supplies a log request command to the USB memory 100 and reads a log from the USB memory 100 in operation S784.

In operation S788, the processor 42 displays the received log on the display 48 or supplies the received log to the server 20. The server 20 thus maintains and manages the security of the USB memory 100. When the log is displayed, a request to reconstruct the file system may be issued to the USB memory 100.

In operation S790, the processor 42 supplies, to the USB memory 100, a command requesting the USB memory 100 to reconstruct the file system in response to an instruction from the user or via the server 20 or in response to a command from the server 20. The USB memory 100 reconstructs the file system on the flash memory 134. Processing returns to operation S702.

If the processor 42 judges in operation S782 that the state information does not indicate the access deactivating mode 508, or if the processor 42 judges in operation S784 that the state information indicates the locked state, the processor 42 displays a message requesting the restoring process. If the processor 42 judges in the restoring process that the USB memory 100 is in the locked state in the access deactivating mode, the USB memory 100 is transitioned to the administrator mode through the authenticating process of the administrator. If the processor 42 judges in the restoring process that the USB memory 100 is in the function limitation mode, the USB memory 100 is transitioned back to the default mode by the manufacturer or the administrator.

Figure 14A:
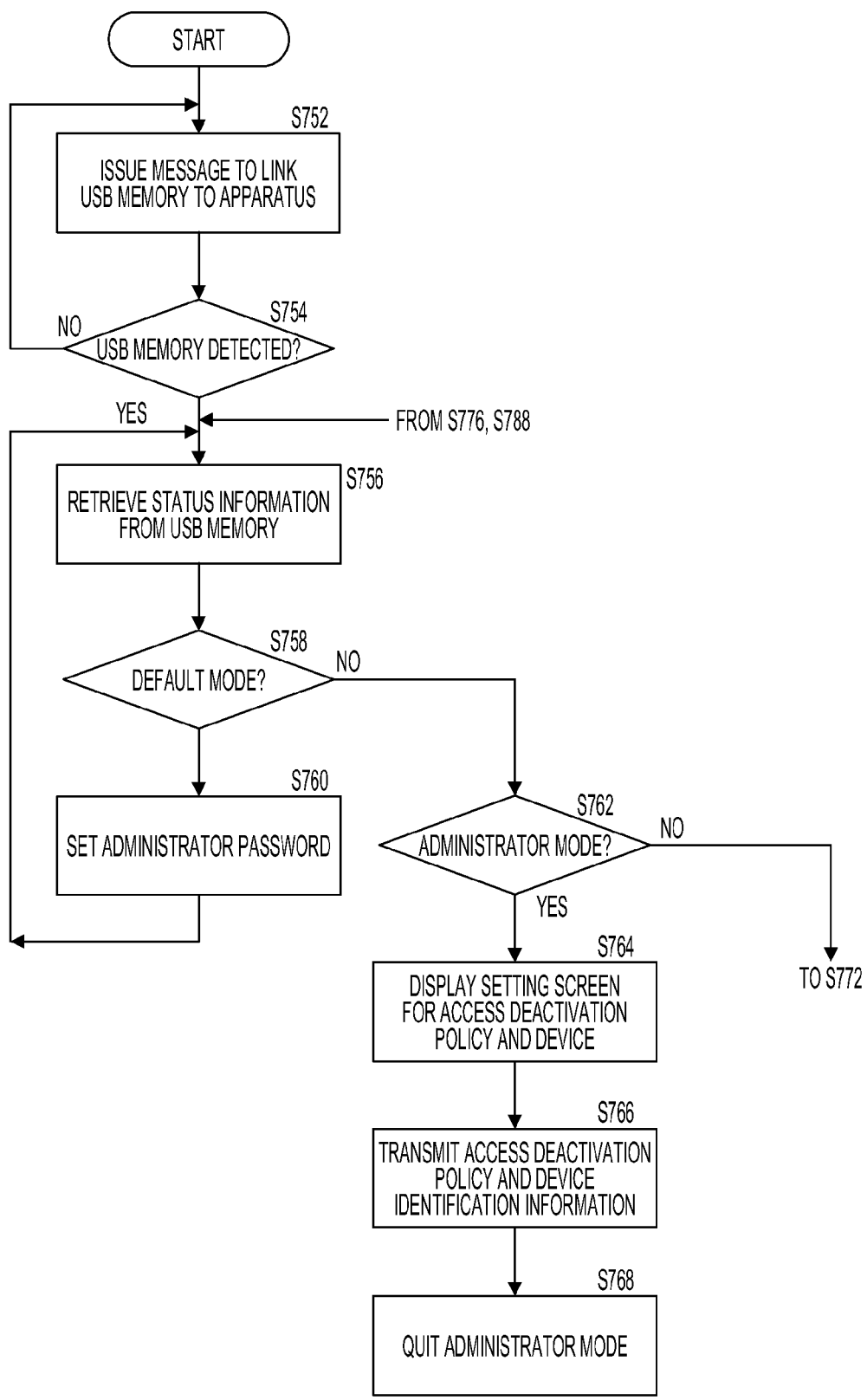
FIG. 14A represents an operation chart of a process that the processor of the information processing apparatus performs to set and add identifying information of the information processing apparatus that is permitted to access the USB memory, and an access deactivating policy in accordance with an administrator USB memory utility program.
Figure 14B:
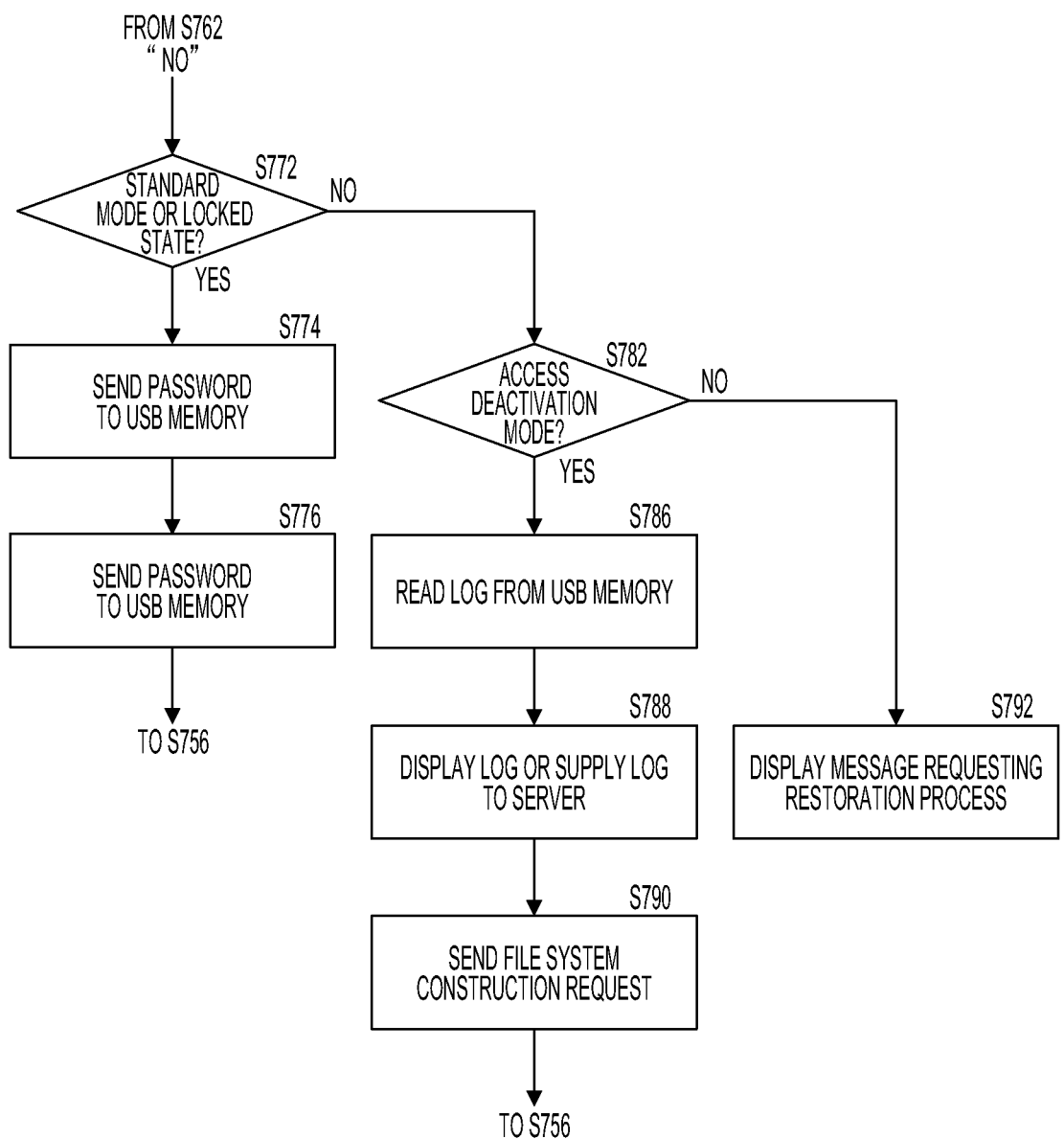
FIG. 14B represents an operation chart of a process that the processor of the information processing apparatus performs to set and add identifying information of the information processing apparatus that is permitted to access the USB memory, and the access deactivating policy in accordance with the administrator USB memory utility program.

FIGS. 14A and 14B are operation charts of a process that the processor 42 of the information processing apparatus 40 executes in accordance with the administrator USB memory utility program PRG_M to set, add, or modify the identifying information of the information processing apparatus permitted to access and the access deactivating policy. The access deactivating policy includes the rule and/or the condition, and the identifying information and/or parameter representing the access deactivating method.

In operation S752 in FIG. 14A, the processor 42 displays, on the display 48, an instruction message requesting the administrator to connect the USB memory 100 to the information processing apparatus 40. In response to the instruction message, the administrator connects the USB memory 100 to the information processing apparatus 40.

In operation S754, the processor 42 judges whether or not the USB memory 100 has been detected. If it is judged that the USB memory 100 has been detected, processing proceeds to operation S756. Operations S752 and S754 are cycled through until the USB memory 100 is detected.

In operation S756, the processor 42 supplies, to the USB memory 100, a command requesting the state information and retrieves the present state information from the USB memory 100. In response to the command, the command processor 24 mounted on the CPU 122 of the USB memory 100 transmits the present state information to the information processing apparatus 40 via the state output unit 30.

In operation S758, the processor 42 judges whether or not the present state of the USB memory 100 is in the default mode (the state at the shipment). If it is judged that the USB memory 100 is the default mode, the processor 42 instructs the display 48 to input the ID and password and supplies the input ID and password to the USB memory 100 in operation S760. The authenticating processor 22 in the USB memory 100 sets the ID and password of the administrator for the administrator authentication. The USB memory 100 is transitioned to the administrator mode. Processing returns to operation S756.

In operation S762, the processor 42 judges whether or not the USB memory 100 is currently in the administrator mode. If it is judged that the USB memory 100 is currently in the administrator mode, the processor 42 displays a screen in operation S764 for setting, adding, or modifying the device identifying information of the information processing apparatus permitted to access and the access deactivating policy. The processor 42 may retrieve the present access deactivating policy (the rule or condition, and the deactivating method) from the internal flash memory 124 and display the present access deactivating policy. The administrator may set, add, or modify on the screen the present access deactivating policy (the rule or condition, and the deactivating method), and the device identifying information.

In operation S766, the processor 42 transmits to the USB memory 100 the device identifying information and the access deactivating policy (the rule or condition and the identifying information and/or parameter representing the deactivating method), set, added or modified by the administrator. The command processor 24 in the USB memory 100 causes the authenticating processor 22 to store the received device identifying information and causes the access deactivating policy memory 26 to store the access deactivating policy (the identifying information and/or the parameter).

In operation S768, the processor 42 displays, on the display 48, a screen instructing the administrator mode to be terminated. When the administrator terminates the administrator mode, the USB memory 100 is transitioned to the standard mode.

If it is judged in operation S762 that the state information does not indicate the administrator mode, the processor 42 judges in operation S772 in FIG. 14B whether or not the USB memory 100 is currently in the standard mode or in the locked state. If it is judged that the USB memory 100 is currently neither in the standard mode nor in the locked mode, the processing in operation S772 proceeds to operation S782.

If it is judged in operation S772 that the state information indicates the standard mode or the locked state, the processor 42 displays, on the display 48, a screen for administrator authentication in operation S774. The administrator enters the ID and password on the screen.

In operation S776, the processor 42 transmits the input administrator ID and password to the USB memory 100. The USB memory 100 is thus transitioned to the administrator mode. If the encryption key and/or data is deleted, the USB memory 100 is transitioned to the access deactivating mode 508 in a lock-canceled state. Processing returns to operation S756.

Operations 782 and 786-792 are similar to those in FIG. 13. If it is judged in operation S782 that the USB memory 100 is in the access deactivating mode 508 other than the locked state, processing proceeds to operation S786. Subsequent to operation S790, processing returns to operation S756.

If it is judged in operation S782 that the state information does not indicate the access deactivating mode, the processor 42 displays in operation S792 a message requesting the restoring process. If the USB memory 100 is in the access deactivating mode in the restoring process, the manufacturer or the administrator operates to return the USB memory 100 to the default mode.

FIG. 15A depicts an administrator screen displayed on the display 48 of the information processing apparatus 40 in operation S764 of FIG. 14A. The identifying information of the information processing apparatus permitted to access the USB memory 100 is set, added, or modified on the administrator screen. Referring to FIG. 15A, a list of types and identifying information of information processing apparatuses permitted to access the USB memory 100 is displayed. The administrator attaches, for example, a check mark (√) to an information processing apparatus to be newly permitted to access the USB memory 100.

FIG. 15B depicts an administrator screen displayed on the display 48 of the information processing apparatus 40 in operation S764 of FIG. 14A. The access deactivating policy (the rule or the condition, and the deactivating method) is set, added, or modified on the USB memory 100 using the administrator screen. Referring to FIG. 15B, a list of access deactivating policies of the USB memory 100 is displayed on the administrator screen. The administrator attaches, for example, a check mark (√) to an access deactivating policy to be newly set or added.

Second Embodiment

Figure 16:
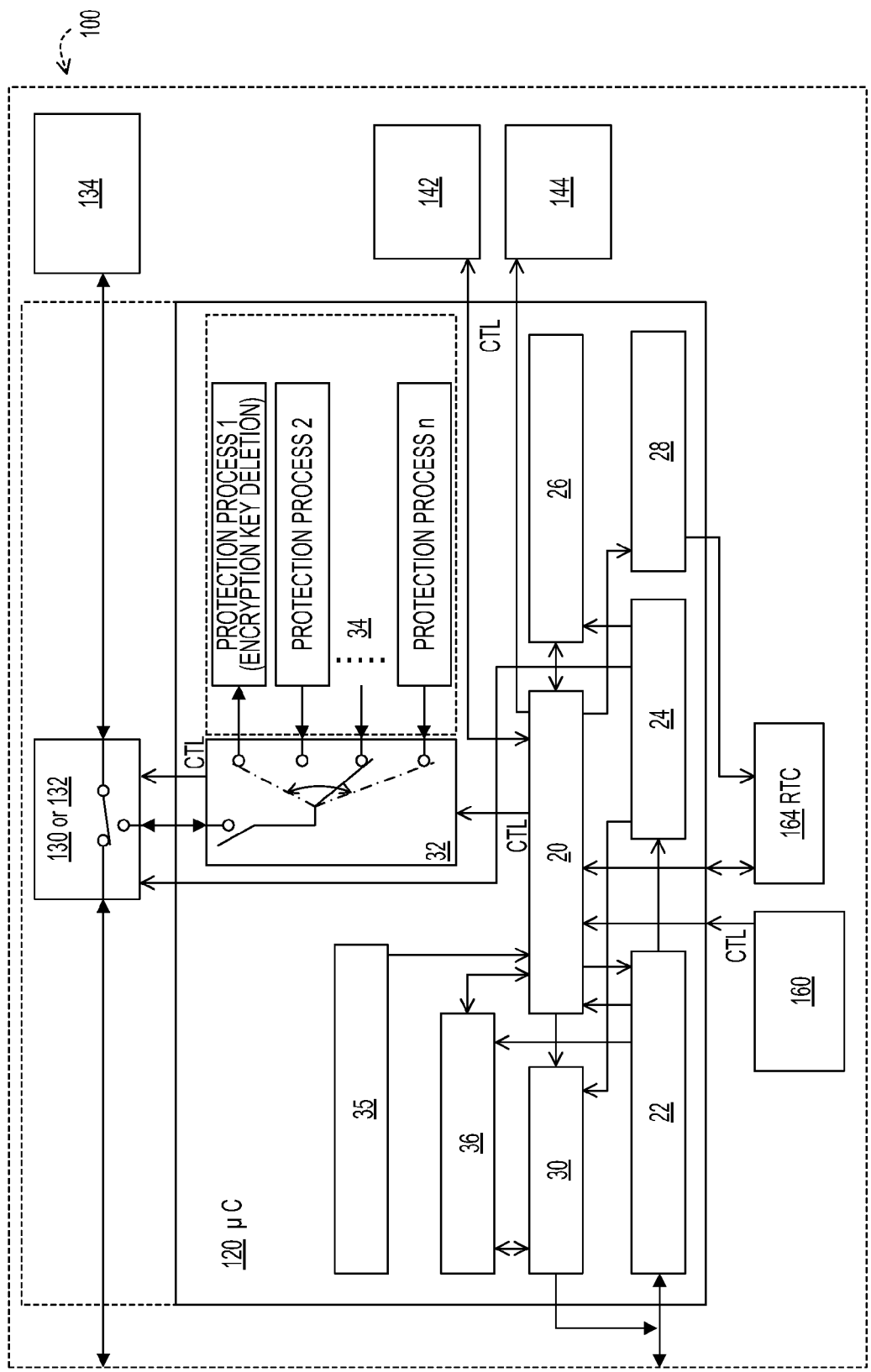
FIG. 16 is a functional block diagram depicting a configuration and arrangement of major internal elements of a microcomputer of a second embodiment of the present invention.

A second embodiment is described below with reference to FIGS. 16 and 17. FIG. 16 depicts an example of a configuration and arrangement of internal elements of a μC 120 in accordance with the second embodiment. In comparison of FIG. 16 with FIG. 5 (the first embodiment), a power source check module 35 is connected as a power supplying start detecting part to the policy evaluation unit 20. The power source check module 35 checks whether the information processing apparatus 40 has started power supplying. The power source check module 35 determines the power supplying start by determining whether the information processing apparatus 40 is connected and whether power supplied from the information processing apparatus 40 is above a given threshold value.

Figure 17:
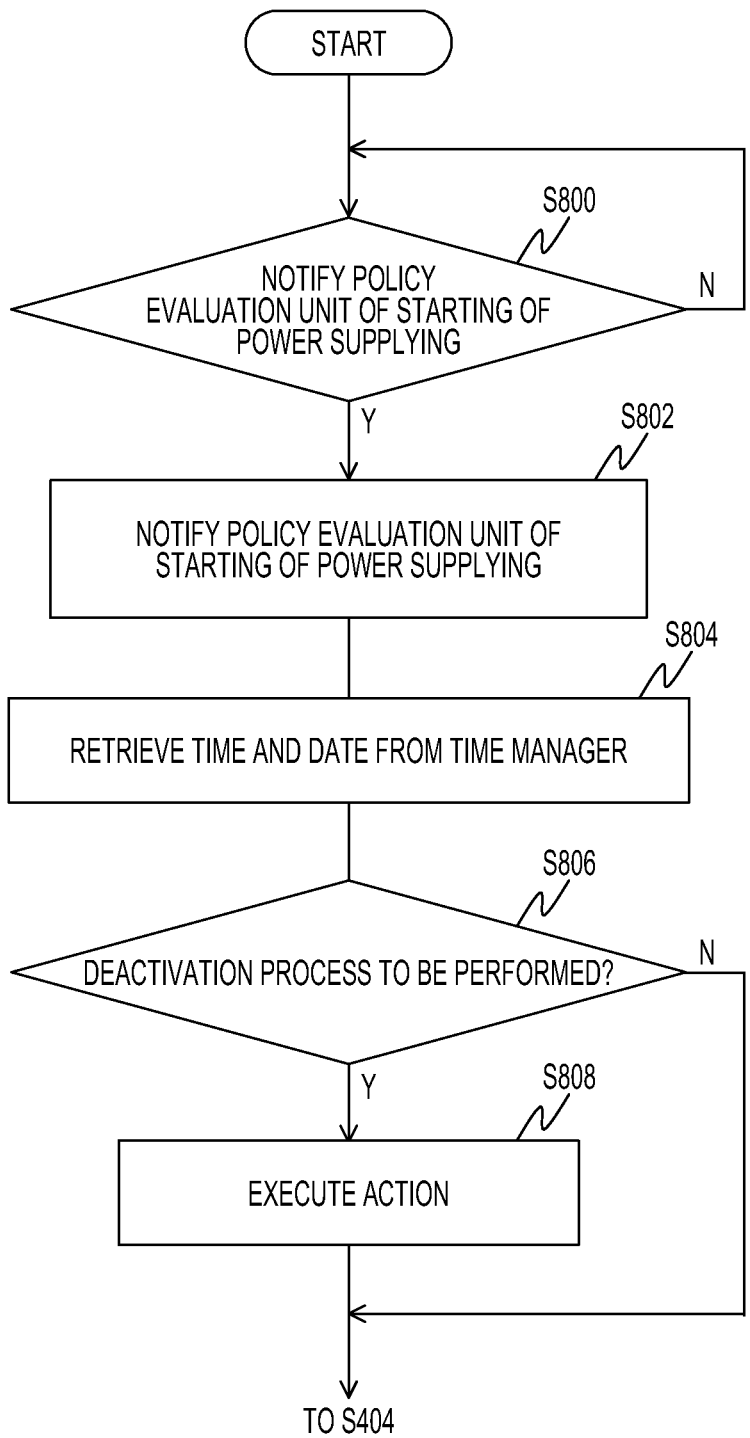
FIG. 17 represents an operation chart representing a process executed, in place of operation S402 of FIG. 6A, in accordance with the second embodiment.

FIG. 17 is an operation chart representing a process that is performed in the second embodiment in place of operation S402 in FIG. 6A. In operation S800 in FIG. 17, the power source check module 35 judges whether the information processing apparatus 40 has started power supplying. If the answer to operation S800 is affirmative, processing proceeds to operation S802. The power source check module 35 notifies the policy evaluation unit 20 that the information processing apparatus 40 has started power supplying.

In operation S804, the policy evaluation unit 20 acquires the present time and date measured by the real-time clock 164 from the time manager 28 that manages the real-time clock 164. In operation S806, the policy evaluation unit 20 judges whether to protect the USB memory 100, e.g., whether to deactivate accessing to a data file on the flash memory 134, based on the present time and date, and the access deactivating policy stored on the access deactivating policy memory 26. In accordance with the second embodiment, the access deactivating policy depicted in FIG. 8B is stored on the access deactivating policy memory 26.

If the answer to operation S806 is affirmative, the policy evaluation unit 20 instructs the access deactivating processor 34 in operation S808 to perform a deactivating process. The access deactivating processor 34 performs the deactivating process in response to the instruction. Processing proceeds to operation S404 in FIG. 6A. The affirmative answer to operation S806 indicates that time set in the access deactivating policy (a threshold value in FIG. 8B) has elapsed with the USB memory 100 unconnected to the information processing apparatus 40. In accordance with the second embodiment, if the USB memory 100 is to execute the access deactivating process before the USB memory 100 is connected to the information processing apparatus 40, the access deactivating process is to be performed immediately subsequent to a connection of the USB memory 100 to the information processing apparatus 40.

If the answer to operation S806 is non-affirmative, processing proceeds to operation S404 without performing the access deactivating process. The same process operations as those of the first embodiment are performed thereafter.

In accordance with the second embodiment as described above, the power source check module 35 detects the start of power supplying from the information processing apparatus 40 and notifies the policy evaluation unit 20 of the power supplying start. When the power supplying starts, the policy evaluation unit 20 judges whether the time set in the access deactivating policy elapsed before the power supplying from the information processing apparatus 40. If the time elapsed, the policy evaluation unit 20 instructs the access deactivating processor 34 to perform the access deactivating process. In accordance with the second embodiment, the policy evaluation unit 20 does not perform the access deactivating process based on the battery and charger 160, while the USB memory 100 is not powered from the information processing apparatus 40. In accordance with the second embodiment, the power capacity of the battery and charger 160 is thus reduced. The battery and charger 160 and the USB memory 100 are thus miniaturized. In contrast, the RTC 164 operates from the power of the battery and charger 160 in the same manner as in the first embodiment. Time measurement is performed without power supplying from the outside. The battery and charger 160 may measure time regardless of the connection with the information processing apparatus 40. The measurement of the real-time clock 164 is free from any tampering performed on the information processing apparatus 40.

In accordance with the preceding embodiments, the policy evaluation unit 20 performs the access deactivating process on condition that the given time elapsed prior to the power supplying from the information processing apparatus 40. The present invention is not limited to this arrangement. Alternatively, the policy evaluation unit 20 may perform the access deactivating process based on another condition (such as a drop in the battery remaining power).

Third Embodiment

Figure 18:
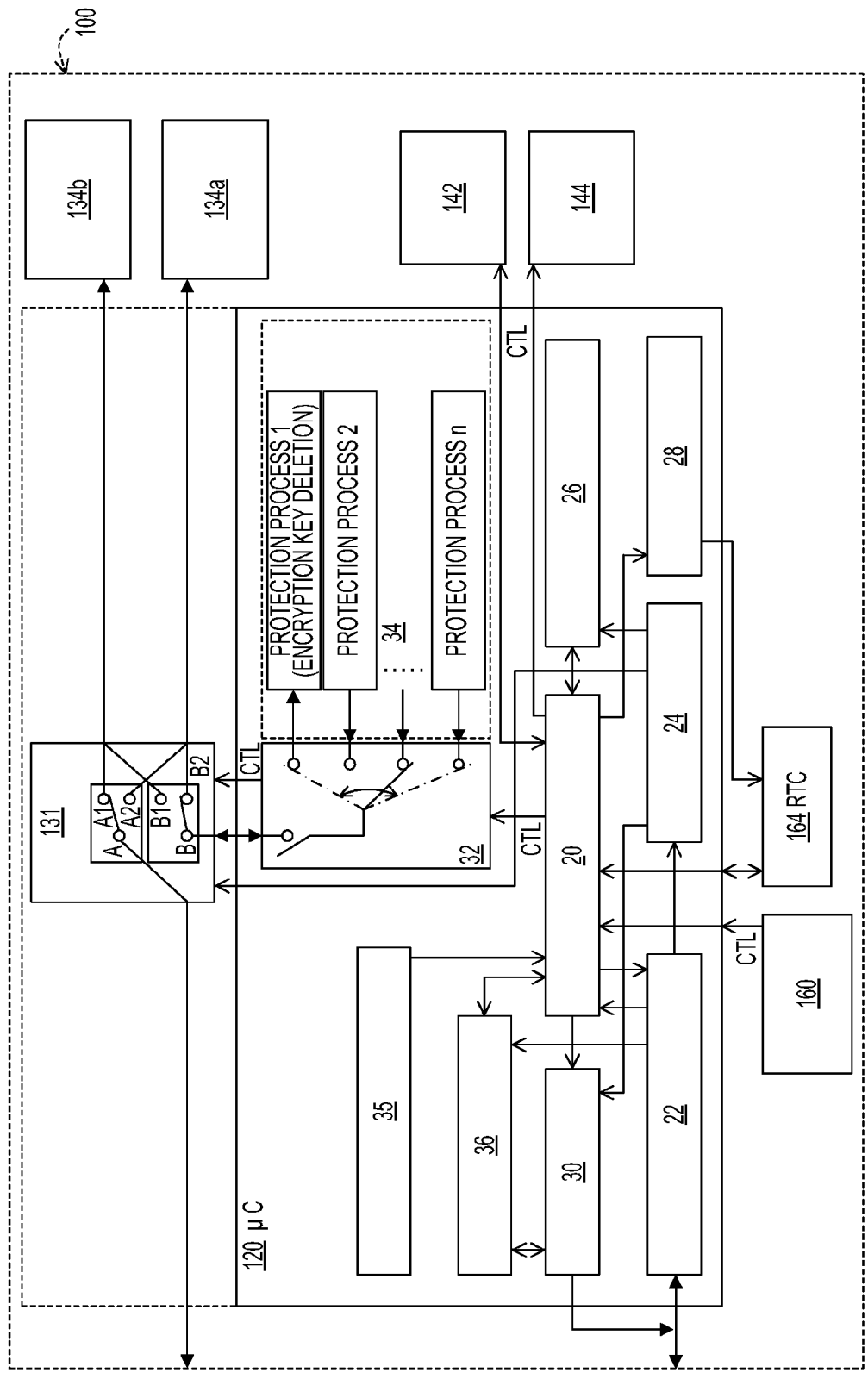
FIG. 18 is a functional block diagram depicting a configuration and arrangement of major internal elements of a microcomputer of a third embodiment.

The third embodiment is described below with reference to FIGS. 18 and 19. FIG. 18 depicts an example of a configuration and arrangement of internal elements of a μC 120 in accordance with the third embodiment. In comparison of FIG. 18 with FIG. 5 (the first embodiment), the USB memory 100 includes two flash memories 134a and 134b, and a hub switch 131 switching between the flash memories 134a and 134b. The hub switch 131 includes two switch sections A and B. As depicted in FIG. 18, the flash memory 134a is deactivated with a terminal A1 of the switch section A and a terminal B2 of the switch section B selected. This state allows data to be stored onto the flash memory 134b or data to be read from the flash memory 134b. If a terminal A2 of the switch section A and a terminal B1 of the switch section B are selected, the flash memory 134b is deactivated. This state allows data to be stored onto the flash memory 134a or data to be read from the flash memory 134a. If the hub switch 131 takes a state different from the states described above, an error is triggered.

Figure 19:
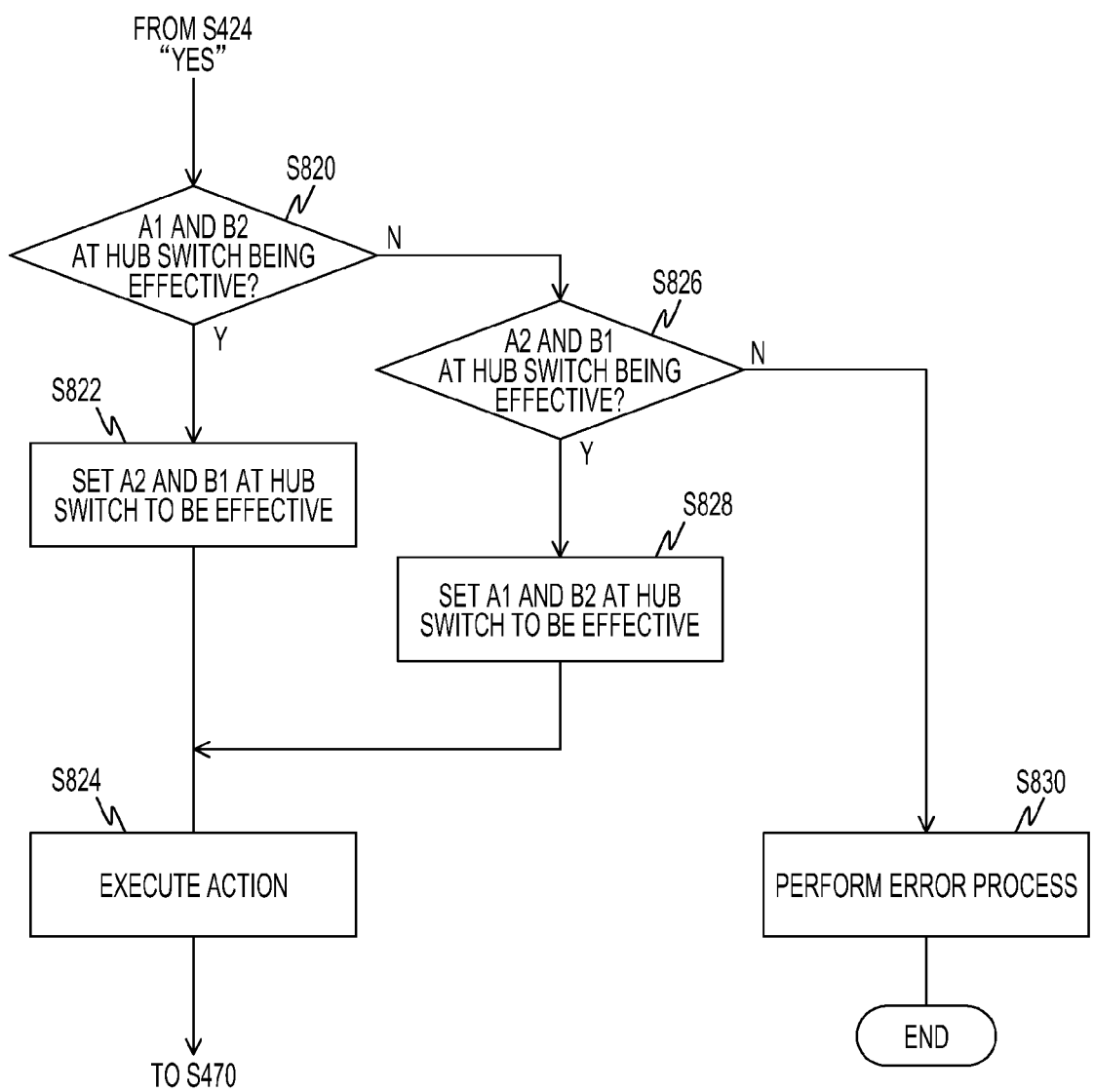
FIG. 19 represents an operation chart of a process, executed in place of operation S426 subsequent to an affirmative judgment in operation S424 in FIG. 6B, in accordance with the third embodiment.

FIG. 19 is an operation chart representing in the third embodiment a process that is performed in place of operation S426 if the answer to operation S424 of FIG. 6B is affirmative. In the process of FIG. 19, the policy evaluation unit 20 judges in operation S820 whether or not the terminal A1 of the switch section A is first selected, and in operation S820 whether or not the terminal B2 of the switch section B is selected. An affirmative answer to operation S820 indicates that the writing and reading of the data on the flash memory 134b have been heretofore permitted. In response to the affirmative answer to operation S820, processing proceeds to operation S822. The policy evaluation unit 20 then selects the terminal A2 of the switch section A and the terminal B1 of the switch section B in the hub switch 131. In other words, the policy evaluation unit 20 switches the hub switch 131 to a different state. In operation S824, the policy evaluation unit 20 instructs the access deactivating processor 34 to perform a deactivating process with the terminals A2 and B1 remaining selected. In response to the instruction, the access deactivating processor 34 performs the access deactivating process. Since the terminals A2 and B1 are selected on the hub switch 131, the access deactivating processor 34 reads the data from the flash memory 134b being heretofore allowed the data to be stored in so as to perform the access deactivating process. While the access deactivating process is in progress on the flash memory 134b, the flash memory 134a permits data to be stored in or the data to be read from the flash memory 134b. Processing proceeds to operation S470 in FIG. 6B.

If the answer to operation S820 is non-affirmative, processing proceeds to operation S826. In operation S826, the policy evaluation unit 20 judges whether the terminal A2 of the switch section A and the terminal B1 of the switch section B are selected on the hub switch 131. An affirmative answer to operation S826 indicates that data stored and the data reading operations have been heretofore permitted on the flash memory 134a. In response to the affirmative answer to operation S826, processing proceeds to operation S828. The policy evaluation unit 20 then selects the terminal A1 of the switch section A and the terminal B2 of the switch section B on the hub switch 131. In operation S824, the policy evaluation unit 20 instructs the access deactivating processor 34 to take action to perform the access deactivating process with the terminals A1 and B2 remaining selected. In response to the instruction, the access deactivating processor 34 performs the access deactivating process. Since the terminals A2 and B1 are selected on the hub switch 131, the access deactivating processor 34 is to perform the access deactivating process on the flash memory 134a that has heretofore allowed data to be stored in and the data to be read from the flash memory 134a. While the access deactivating process is in progress on the flash memory 134a, the data storing and the data reading operations are permitted on the flash memory 134b. Processing proceeds to operation S470 in FIG. 6B.

If the answer to operation S826 is non-affirmative, the policy evaluation unit 20 performs an error process in operation S830, and ends the process represented in FIG. 19. The error process in operation S830 displays an error indication on the indicator 144, for example.

In accordance with the third embodiment, the process represented in FIG. 19 is performed if the answer to operation S424 is judged to be affirmative. The present invention is not limited to this arrangement. The process represented in FIG. 19 may be performed in response to another affirmative answer, for example, an affirmative answer to operation S434.

While the access deactivating process is performed on one of the two the flash memories 134a and 134b in accordance with the third embodiment, the hub switch 131 permits the information processing apparatus 40 to access other flash memories. In this way, even if the access deactivating process is performed on one flash memory (for example, for a few minutes), the other flash memories remain accessible. The user of the USB memory 100 is free from waiting until the completion of the access deactivating process. The user friendliness of the USB memory 100 is thus increased.

The USB memory 100 includes the two flash memories in accordance with the embodiment. Alternatively, three or more flash memories may be used on the USB memory 100. In such a case, while the access deactivating process is performed on one flash memory that has been heretofore accessible by the information processing apparatus 40, the hub switch 131 permits the information processing apparatus 40 to access another flash memory.

Fourth Embodiment

Figure 20:
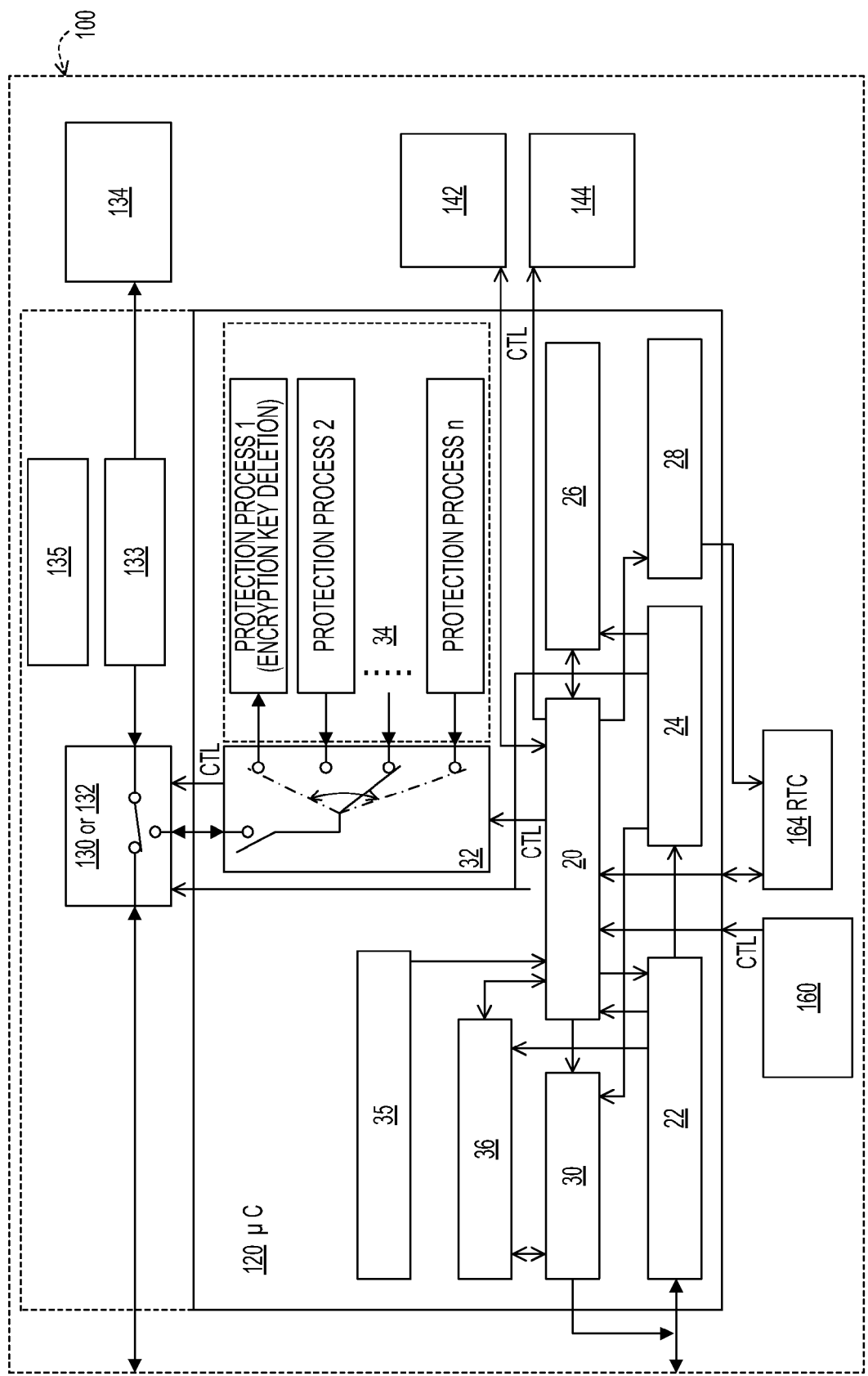
FIG. 20 is a functional block diagram depicting a configuration and arrangement of major internal elements of a microcomputer of a fourth embodiment.

The fourth embodiment is described below with reference to FIG. 20. FIG. 20 depicts an example of a general configuration and arrangement of major internal elements of a μC 120 in accordance with the fourth embodiment. In comparison of FIG. 20 with FIG. 5 (the first embodiment), the μC 120 includes an encryption module 133 between the hub switch 130 and/or 132 and the flash memory 134, and a volatile memory 135 connected to the encryption module 133 as a volatile encryption key memory. The volatile memory 135 is powered from the battery and charger 160.

The encryption module 133 encrypts data to be written onto the flash memory 134 while generating an encryption key. The encryption module 133 decrypts the encrypted data using the generated encryption key. The volatile memory 135 stores the encryption key generated by the encryption module 133. Since the volatile memory 135 is powered from the battery and charger 160, the encryption key stored on the volatile memory 135 is deleted when the battery is removed from the USB memory 100.

In accordance with the fourth embodiment, the encryption module 133 generates the encryption key and encrypts data received from the information processing apparatus 40, and the volatile memory 135 stores the generated encryption key. Even if the access deactivating process is not performed with the battery and charger 160 illegally removed from the USB memory 100, the cutoff of power to the volatile memory 135 causes the encryption key to be deleted on the volatile memory 135. With the encryption key deleted from the volatile memory 135, the same effect as the access deactivating process results. The security of the USB memory 100 is thus increased.

Fifth Embodiment

Figure 21:
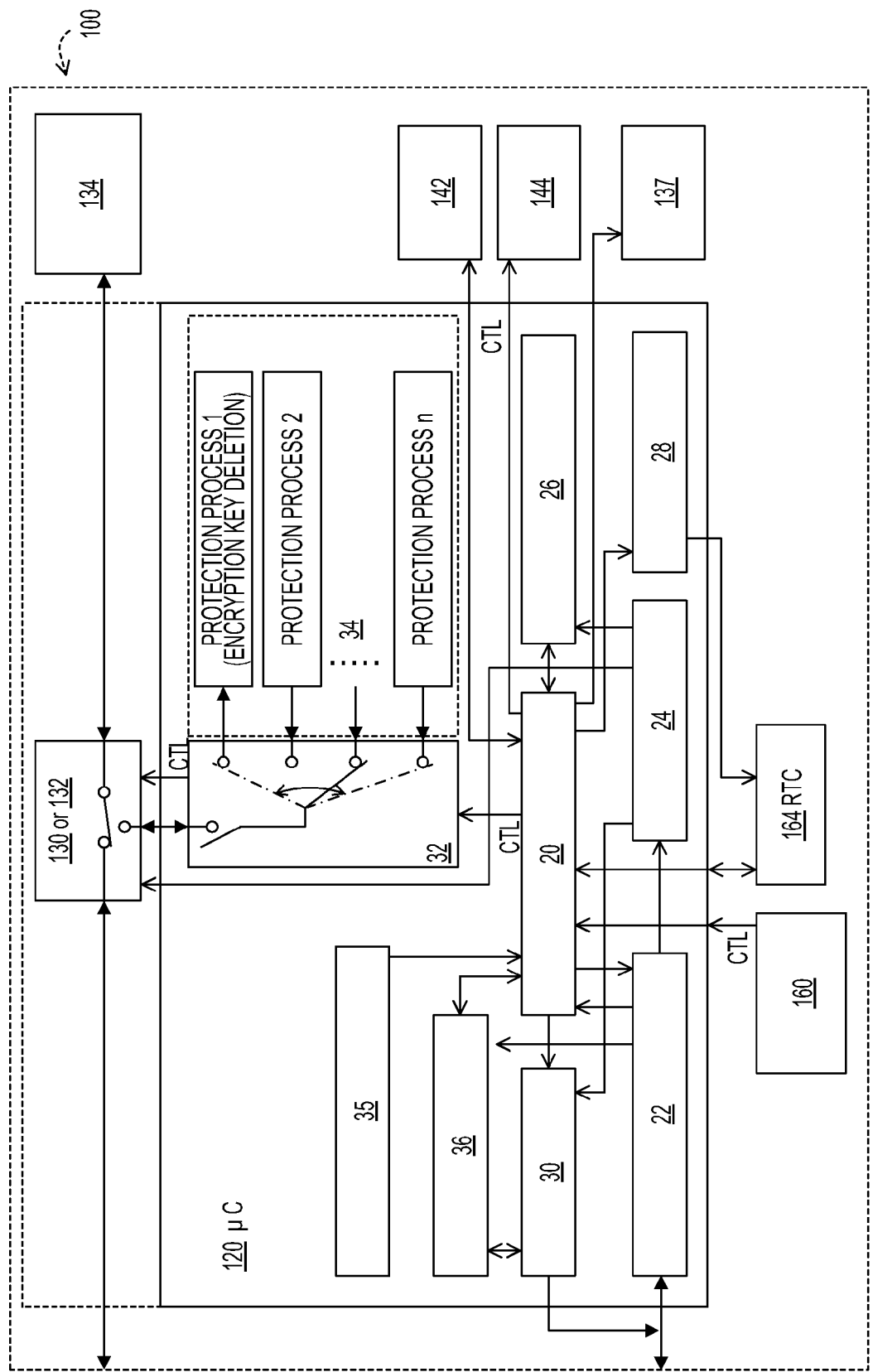
FIG. 21 is a functional block diagram depicting a configuration and arrangement of major internal elements of a microcomputer of a fifth embodiment.

The fifth embodiment is described with reference to FIGS. 21-23. FIG. 21 depicts an example of a general configuration and arrangement of internal elements of a μC 120 in accordance with the fifth embodiment. In comparison of FIG. 21 with FIG. 5 (the first embodiment), the USB memory 100 includes an RF-ID reader 137. The RF-ID reader 137 is connected to the policy evaluation unit 20.

Figure 22:
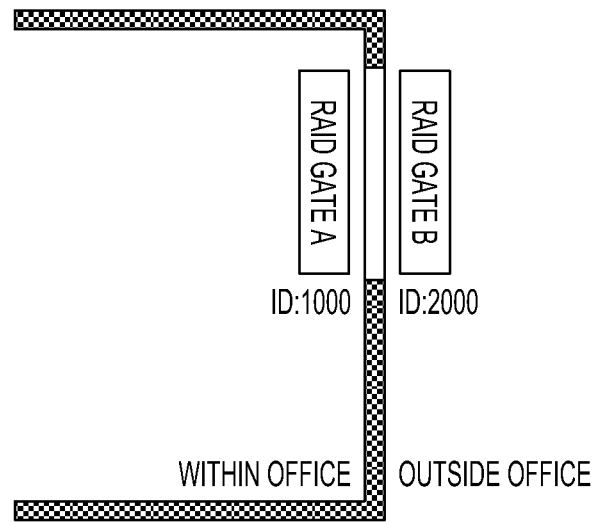
FIG. 22 illustrates an office where a USB memory of the fifth embodiment may be applied.

The RF-ID reader 137 reads and acquires an ID 1000 from an RF-ID gate A when the RF-ID gate A as an information transmitter is passed in an office illustrated in FIG. 22. The RF-ID reader 137 also reads and acquires an ID 2000 from an RF-ID gate B when the RF-ID gate B as an information transmitter is passed. The RF-ID reader 137 acquires the ID 1000 with the RF-ID gates arranged as illustrated in FIG. 22 if the USB memory 100 is present in the office. The RF-ID reader 137 acquires the ID 2000 a with the USB memory 100 carried externally out of the office. In the access deactivating policy stored on the access deactivating policy memory 26, ID 1000 defines that an access deactivating action is permitted, and ID 2000 defines that the access deactivating action is prohibited.

Figure 23:
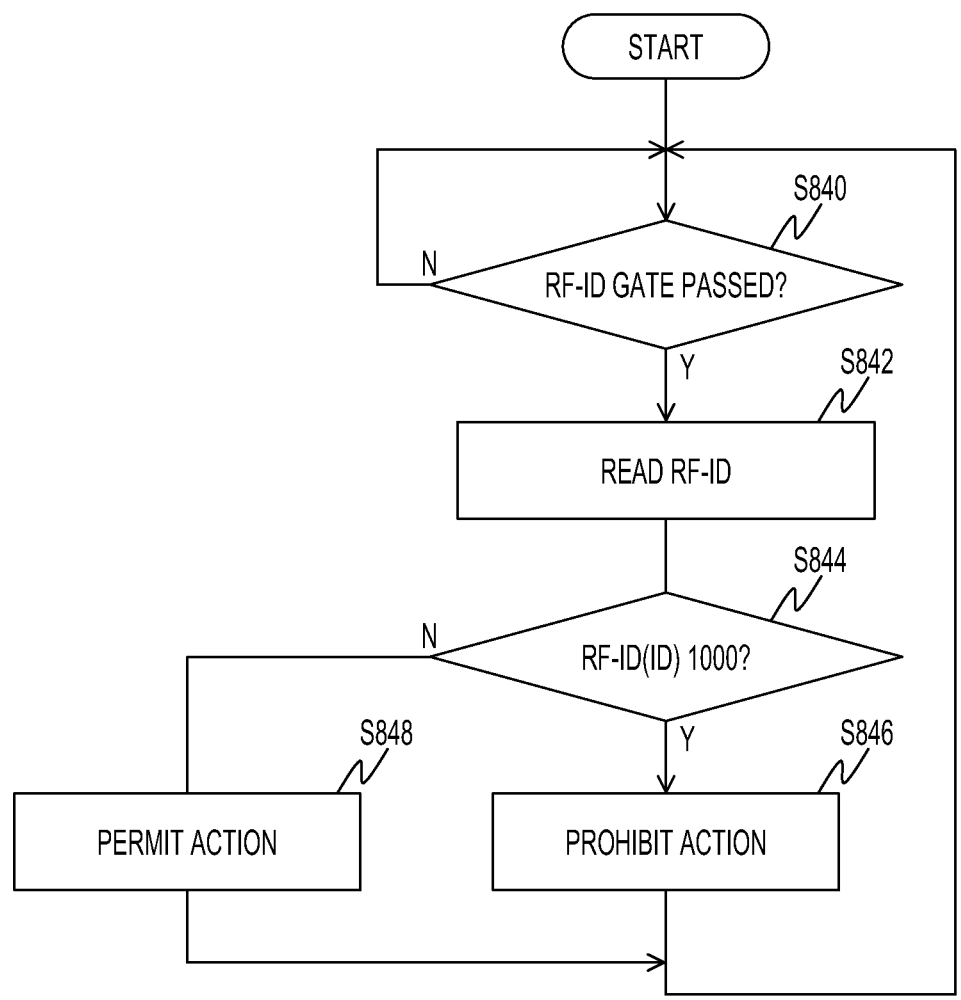
FIG. 23 is an operation chart representing an example of a process that is executed in parallel with the process depicted in FIGS. 6A and 6B.

FIG. 23 is an operation chart representing a process that is performed in parallel with the process of FIGS. 6A and 6B in accordance with the fifth embodiment. As represented in FIG. 23, the RF-ID reader 137 judges in operation S840 whether or not the RF-ID gate has been passed. If the answer to operation S840 is non-affirmative, the process operation in operation S840 is repeated again. If the answer to operation S840 is affirmative, processing proceeds to operation S842. In operation S842, the RF-ID reader 137 reads and acquires an RF-ID (ID). For example, if the RF-ID gate B has been passed, the RF-ID reader 137 acquires ID 2000. The acquired ID is transmitted to the policy evaluation unit 20.

In operation S844, the policy evaluation unit 20 judges whether the ID of RF-ID is 1000. If the answer to operation S844 is affirmative, the policy evaluation unit 20 prohibits the access deactivating action in operation S846. If the answer to operation S844 is non-affirmative, the policy evaluation unit 20 permits the access deactivating action in operation S848.

If the access deactivating action is permitted in the process illustrated in FIG. 23, the access deactivating process illustrated in FIGS. 6A and 6B is performed. If the access deactivating action is prohibited in the process represented in FIG. 23, the access deactivating process represented in FIGS. 6A and 6B is not to be performed even if any process operation of the access deactivating process is reached. In accordance with the embodiment, even when the USB memory 100 is missing, the access deactivating process is not performed in the office where the possibility of the unauthorized use of data is low. In contrast, outside of the office where the possibility of the unauthorized use of data is high, the access deactivating process may be performed.

In accordance with the embodiment, time to the execution of the access deactivating process is counted regardless of the permission or prohibition of the access deactivating process. The present invention is not limited to this arrangement. For example, while the access deactivating process is prohibited, the counting of time to the execution of the access deactivating process may be suspended. In this way, the access deactivating process is performed after a given period of time subsequent to the carrying of the USB memory 100 out of the office.

As described above in accordance with the fifth embodiment, the USB memory 100 includes the RF-ID reader 137 receiving an ID from one of the RF-ID gates A and B. The policy evaluation unit 20 permits or prohibits the execution of the access deactivating process in response to the ID received by the RF-ID reader 137. In accordance with the fifth embodiment, the USB memory 100 switches between the permission and the prohibition of the execution of the access deactivating process without operating the USB memory 100. Whether to permit or prohibit the access deactivating process is automatically switched depending on whether the USB memory 100 is present in a place where the access deactivating process is to be performed, or in a place where the access deactivating process is not to be performed.

In accordance with the fifth embodiment, the access deactivating process is switched between the permission and the prohibition in response to the acquired ID. Alternatively, another action may be switched between the permission and the prohibition. For example, the data reading may be permitted or prohibited by switching. The data reading and writing may be permitted or prohibited by switching.

In accordance with the fifth embodiment, the process of FIGS. 6A and 6B and the process of FIG. 23 are performed in parallel with each other. The present invention is not limited to this method. Alternatively, the process of FIG. 23 may be integrated into the process of FIGS. 6A and 6B.

In accordance with the fifth embodiment, the RF-ID, and the RF-ID reader 137 are used for switching between the permission and the prohibition of the access deactivating process of the USB memory 100. The present invention is not limited to this method. For example, a wireless transmitter may be installed in the office, and a receiver may be installed in the USB memory 100. The access deactivating process may be permitted or prohibited by switching, depending on whether or not a radio wave transmitted from the transmitter is received by the receiver. In such a case, the gain of the receiver and the strength of the radio wave from the transmitter may be set to levels at which the radio wave is received by the receiver when the USB memory 100 is present within the office or in the vicinity of the office.

Sixth Embodiment

Figure 24:
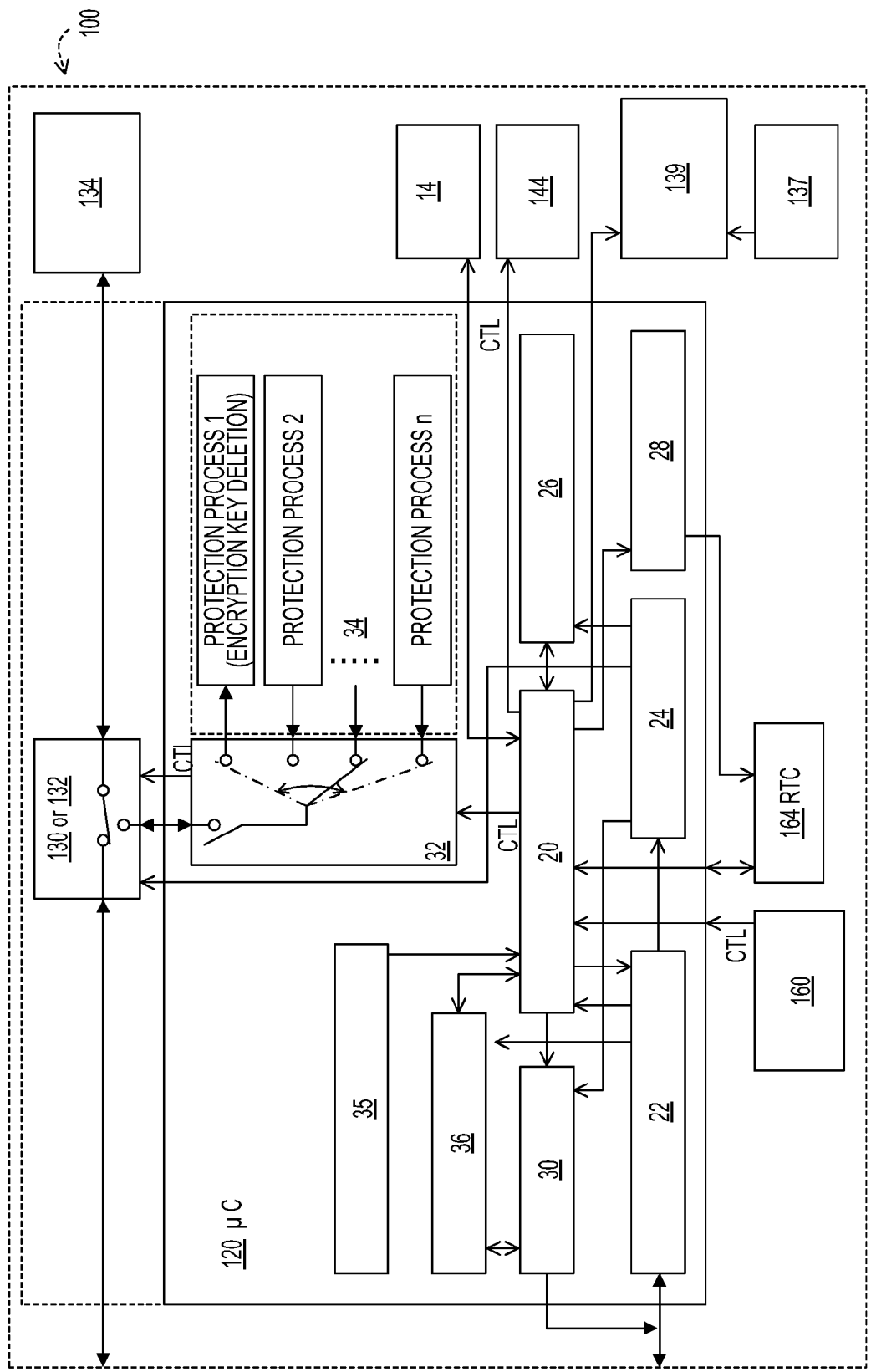
FIG. 24 is a functional block diagram depicting an example of a configuration and arrangement of major internal elements of a microcomputer of a sixth embodiment.

The sixth embodiment is described below with reference to FIGS. 24-27. FIG. 24 depicts a general configuration and arrangement of internal elements of a μC 120 in accordance with the sixth embodiment. In comparison of FIG. 26 with FIG. 5 (the first embodiment), the USB memory 100 of the sixth embodiment includes a read ID history memory 139 between the RF-ID reader 137 and the μC 120.

Figure 25:
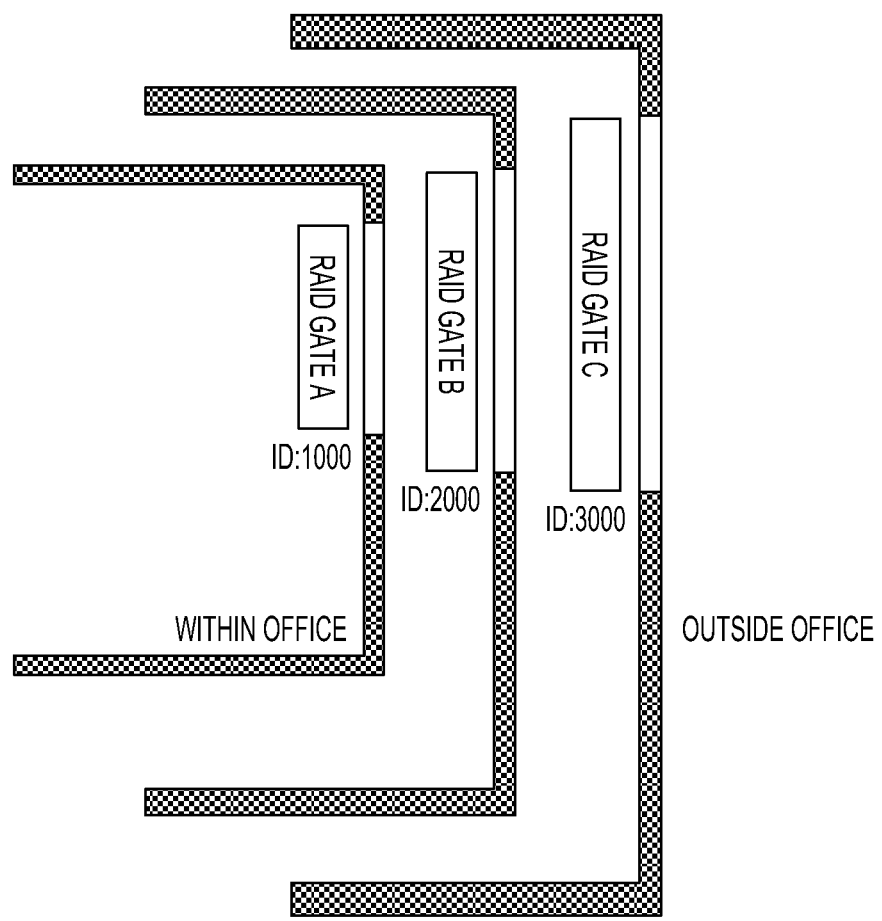
FIG. 25 illustrates a layout of RF-ID gates in accordance with the sixth embodiment.

The read ID history memory 139 stores a plurality of IDs (three IDs here) acquired by the RF-ID reader 137 in order from older to new acquisition. For example, three RF-ID gates A, B, and C are installed in an office as represented in FIG. 25. The USB memory 100 is carried into the office through the gates in the order of the gate C, the gate B, and the gate A. As depicted in FIG. 26A, the read ID history memory 139 stores three IDs 3000, 2000, and 1000 in the order from the top. If the USB memory 100 is returned back into the office through the gate C after going out of the office, the USB memory 100 passes the gates in the order of the gate A, the gate B, the gate C, and the gate C. The read ID history memory 139 thus stores three IDs 3000, 3000, and 2000 in the order from old to new as depicted in FIG. 26B.

The access deactivating policy of the fifth embodiment indicates that the access deactivating action is prohibited if the read ID history memory 139 stores three IDs 1000, 2000, and 3000 in the order from old to new. The access deactivating policy also indicates that the access deactivating action of the access deactivating process is permitted in the other cases.

Figure 27:
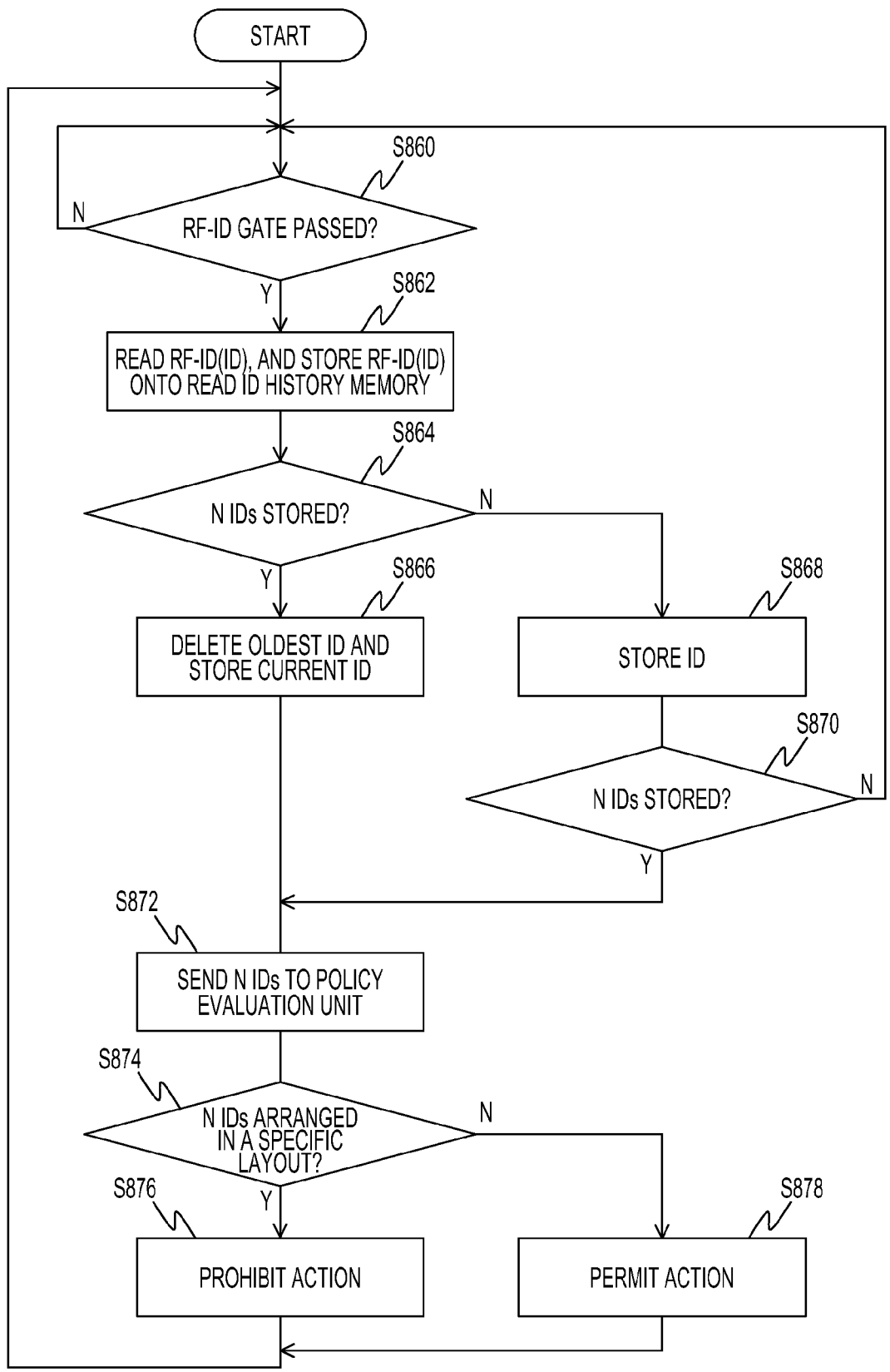
FIG. 27 is an operation chart representing a process executed in parallel with the process of FIGS. 6A and 6B in accordance with the sixth embodiment.

FIG. 27 is an operation chart representing a process that is performed in parallel with the process of FIGS. 6A and 6B In accordance with the sixth embodiment. As represented in FIG. 27, the RF-ID reader 137 judges in operation S860 whether an RF-ID gate has been passed. If the answer to operation S860 is non-affirmative, operation S860 is repeated again. If the answer to operation S860 is affirmative, processing proceeds to operation S862. In operation S862, the RF-ID reader 137 reads an ID from the RF-ID, and stores the read ID onto the read ID history memory 139.

In operation S864, the policy evaluation unit 20 judges whether the read ID history memory 139 has stored N number of IDs (N=3 here, for example). If the answer to operation S864 is non-affirmative, processing proceeds to operation S868. Processing proceeds to operation S870 after the hub switch 130 stores the acquired ID.

In operation S870, the policy evaluation unit 20 judges whether the read ID history memory 139 has stored N IDs. If the answer to operation S870 is non-affirmative, processing returns to operation S860. These process operations are cycled through until N IDs have been stored. At the moment the read ID history memory 139 stores N IDs, an affirmative answer to operation S870 results. Processing proceeds to operation S872.

If the answer to operation S864 is affirmative, e.g., if the read ID history memory 139 stores N IDs, processing proceeds to operation S866. In operation S866, the read ID history memory 139 deletes the oldest ID, and then stores the current ID. Processing proceeds to operation S872.

In operation S872, the read ID history memory 139 sends the N IDs to the policy evaluation unit 20. In operation S874, the policy evaluation unit 20 judges whether or not the N IDs are arranged in a given layout. The given layout refers to the order of IDs "1000, 2000, and 3000" defined in the access deactivating policy. If the answer to operation S877 is affirmative, it is likely that the USB memory 100 is present within the office, and the action of the access deactivating process is prohibited in operation S876. If the answer to operation S874 is non-affirmative, it is less likely that the USB memory 100 is present within the office, and the action of the access deactivating process is permitted in operation S878.

The other process operations remain unchanged from those in the fifth embodiment.

In accordance with the sixth embodiment, the policy evaluation unit 20 permits or prohibits the execution of the access deactivating process based on the order of the reception of information received by the RF-ID reader. As in the fifth embodiment, the access deactivating process is performed depending on whether the USB memory 100 is within or outside the office. Only if the USB memory 100 has entered the office in the authorized route, the access deactivating process is prohibited.

When N or more IDs are stored on the read ID history memory 139 in accordance with the embodiment, the new ID is substituted for the oldest ID with the oldest ID deleted. Alternatively, all the IDs may be deleted from the read ID history memory 139 if a particular gate has been passed. Alternatively, all the IDs may be deleted from the read ID history memory 139 if particular gates have been passed in a given order.

In accordance with the above-described embodiment, the access deactivating process is switched between permission and prohibition depending on the order of stored IDs. Alternatively, a counter may be used in place of the IDs.

Two or more of the second through sixth embodiments may be used in combination. Such a combination may result in a corresponding combination of advantages.

Further, according to an aspect of the embodiments, any combinations of the described features, functions and/or operations may be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

All the examples and conditional expressions described herein are intended to help the reader understand the invention to which the inventor has technically contributed, and the concept of the invention. The examples and the expressions are not intended to limit the scope of the invention. The arrangement of the specification is unrelated to the quality of the invention. The embodiments of the present invention have been discussed. It is to be understood that a variety of changes, substitutions, and modifications are possible to the invention without departing from the scope and spirit of the invention.

The invention claimed is:

1. A storage device that is detachably coupled to a host device and stores data accessed by the host device, the storage device comprising:
   a first memory;
   a second memory;
   a third memory which stores a program;
   a processor which executes, based on the program, a process comprising:
      judging which conditions represented by setting information are satisfied with an operation state of the storage device, the setting information including relationships between combinations of a plurality of deactivating processes each of which deactivates access to the data at different levels and the conditions under which the combinations of the plurality of deactivating process are performed;
      executing one of the combinations which corresponds to a condition which is satisfied with the operation with regard to the first memory; and
      enabling the host device to access the second memory while executing one of the combinations by the executing with regard to the first memory, and
   a switch configured to couple the processor with the first memory, to couple the host device with the second memory, to disconnect the processor from the second memory, and to disconnect the host device from the first memory while executing one of the combinations.

2. The storage device according to claim 1, wherein the setting information is set through an interface.

3. The storage device according to claim 1, wherein the setting information is modified through an interface.

4. The storage device according to claim 1, wherein the conditions under which the combinations of the plurality of deactivating process are performed are a given threshold value applied to a time-varied factor, wherein the setting information includes first setting information including a first condition indicating a first threshold value having a short elapsed time, and second setting information including a second condition indicating a second threshold value having a long elapsed time longer than the short elapsed time of the first condition, and
   the judging judges whether the condition is satisfied by comparing the time-varied factor time-varied in the operation of the storage device, with the condition indicated by the setting information.

5. The storage device according to claim 4, the process further comprising:
   detecting the presence of the host device through the interface; and
   causing the judging to suspend a judging operation of the judging when the detecting has detected the presence of the host device.

6. The storage device according to claim 4, the process further comprising:
   storing information indicating a deactivating process, when the executing executes one of the combinations, on a log storing region different from a data storing region storing the data that the deactivating process has denied accessing to; and
   transmitting the information stored by the storing to the host device.

7. The storage device according to claim 4, the process further comprising:
   ordering an operating time at which the judging is to be operated.

8. The storage device according to claim 4, the process further comprising:
   detecting a power supplying start by the host device and informing the executing of the power supplying start,
   wherein the executing executes one of the combinations in response to the detecting when the judging has judged that the condition is satisfied, while no power is being supplied from the host device.

9. The storage device according to claim 1, the process further comprising:
   detecting the presence of the host device through the interface; and
   causing the judging to suspend a judging operation of the judging when the detecting has detected the presence of the host device.

10. The storage device according to claim 1, the process further comprising:
    storing information indicating a deactivating process, when the executing executes one of the combinations, on a log storing region different from a data storing region storing the data that the deactivating process has denied accessing to; and
    transmitting the information stored by the storing to the host device.

11. The storage device according to claim 1, the process further comprising:
displaying a state of the storage device or a period at which the condition is judged to be satisfied.

12. The storage device according to claim 1, the process further comprising:
ordering an operating time at which the judging is to be operated.

13. The storage device according to claim 1, the process further comprising:
detecting a power supplying start by the host device and informing the executing of the power supplying start,
wherein the executing executes one of the combinations in response to the detecting when the judging has judged that the condition is satisfied, while no power is being supplied from the host device.

14. The storage device according to claim 1, the process further comprising:
encoding data from the host device and generating an encryption key; and
storing the encryption key.

15. The storage device according to claim 1, the process further comprising:
receiving information from an information transmitter externally installed,
allowing one of permitting and prohibiting an execution of one of the combinations in response to the information received via the receiver part.

16. The storage device according to claim 15, wherein the receiving receives information from a plurality of information transmitters, and
wherein the process further comprising:
allowing one of permitting and prohibiting the execution of one of the combinations in an order of reception of the information received by the receiving.

17. The storage device according to claim 1, wherein the host device displays a screen for setting the setting information by a user.

18. A method of controlling access to data in a storage device by a host device, the storage device being detachably coupled to the host device, the method comprising:
judging, by a processor in the storage device, which conditions represented by setting information are satisfied with an operation state of the storage device, the setting information including relationships between combinations of a plurality of deactivating processes each of which deactivates access to the data at different levels and the conditions under which the combinations of the plurality of deactivating process are performed;
executing one of the combinations which corresponds to a condition which is satisfied with the operation with regard to a first memory in the storage device;
enabling the host device to access a second memory in the storage device while executing one of the combinations by the executing with regard to the first memory; and
coupling the processor with the first memory, coupling the host device with the second memory, disconnecting the processor from the second memory, and disconnecting the host device from the first memory while executing one of the combinations.

* * * * *